US012571871B2

(12) United States Patent　(10) Patent No.:　US 12,571,871 B2
Parikh et al.　(45) Date of Patent:　*Mar. 10, 2026

(54) METHOD AND SYSTEM FOR LOCATING OBJECTS WITHIN A MASTER SPACE USING MACHINE LEARNING ON RF RADIOLOCATION

(71) Applicant: Cognosos, Inc., Atlanta, GA (US)

(72) Inventors: Nishith M. Parikh, Atlanta, GA (US); James A. Stratigos, Jr., Atlanta, GA (US); Cheng Qi, Atlanta, GA (US); Joseph Kilburn Koberg, Atlanta, GA (US)

(73) Assignee: Cognosos, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,946

(22) Filed: Mar. 22, 2024

(65) Prior Publication Data

US 2024/0230821 A1　Jul. 11, 2024

Related U.S. Application Data

(63) Continuation of application No. 17/959,422, filed on Oct. 4, 2022, which is a continuation-in-part of
(Continued)

(51) Int. Cl.
*G01S 5/00*　(2006.01)
*G01S 5/02*　(2010.01)
(Continued)

(52) U.S. Cl.
CPC ............ *G01S 5/013* (2020.05); *G01S 5/0278* (2013.01); *G06K 7/10297* (2013.01); *G06N 20/10* (2019.01)

(58) Field of Classification Search
CPC ........ G01S 5/013; G01S 5/0278; G01S 5/017; G01S 5/0252; G01S 5/02521;
(Continued)

(56) References Cited

U.S. PATENT DOCUMENTS 8,957,812 B1　2/2015　Hill et al.
9,065,699 B2　6/2015　Stratigos, Jr.
(Continued)

FOREIGN PATENT DOCUMENTS

WO　WO-2015/049660 A1　4/2015

OTHER PUBLICATIONS

Ajayannan et al., Smart Indoor Navigation Using Wifi Triangulation, International Journal of Engineering Research & Technology (IJERT), NCRTET-2015 Conference Proceedings, Special Issue—2015, vol. 3, Issue 04, pp. 1-5.
(Continued)

*Primary Examiner* — Umair Ahsan
(74) *Attorney, Agent, or Firm* — Foley Hoag LLP; John D. Lanza; Emily H. Yasharpour

(57) ABSTRACT

In embodiments, an object location system is configured to receive a transmitted tag package from a Radio Frequency (RF) tag associated with an object. The transmitted tag package includes a representation of RF signals received by the RF tag from respective RF signal sources. The object location system is configured to access multiple data models associated with a respective subspace and generated by associating a RF signal sample received by a tag in the associated subspace at a prior time. The object location system is configured to compare the representation of RF signals to each of the plurality of data models. The object location system is configured to select a candidate data model having a highest correlation with the representation of the RF signals from the comparison. The object location
(Continued)

Object Location System - Simplified Environment Overview system is configured to predict that the object is located in a subspace associated with the candidate data model.

21 Claims, 21 Drawing Sheets

Related U.S. Application Data application No. 17/083,981, filed on Oct. 29, 2020, now abandoned.

(51) Int. Cl.
    *G06K 7/10*         (2006.01)
    *G06N 20/10*      (2019.01)

(58) Field of Classification Search
    CPC ............. G01S 5/02524; G01S 5/02525; G01S 5/02527; G06K 7/10297; G06N 20/10; G06N 20/00; H04W 4/029; H04W 4/80; H04W 64/00; H04W 4/02; H04W 40/244; H04W 4/021; H04W 4/33
    See application file for complete search history.

(56) References Cited

U.S. PATENT DOCUMENTS

| | | | |
|---|---|---|---|
| 9,363,784 | B1 | 6/2016 | Friday et al. |
| 9,408,040 | B2 * | 8/2016 | Cooper ................. H04W 4/025 |
| 9,584,193 | B2 | 2/2017 | Stratigos, Jr. |
| 9,807,724 | B2 | 10/2017 | Titus et al. |
| 10,135,499 | B2 | 11/2018 | Stratigos, Jr. |
| 10,222,448 | B2 | 3/2019 | Burgess et al. |
| 10,554,253 | B2 | 2/2020 | Schantz |
| 10,769,812 | B2 | 9/2020 | Zhao et al. |
| 10,772,059 | B2 | 9/2020 | Weitnauer et al. |
| 2012/0066035 | A1 | 3/2012 | Stanger et al. |
| 2014/0194143 | A1 | 7/2014 | Krainz |
| 2015/0079942 | A1 * | 3/2015 | Kostka ................. H04W 88/08 |
| | | | 455/411 |
| 2015/0091702 | A1 | 4/2015 | Gupta et al. |
| 2016/0295372 | A1 * | 10/2016 | Kapicioglu ........... H04W 64/00 |
| 2018/0160269 | A1 | 6/2018 | Baarman et al. |
| 2020/0285977 | A1 * | 9/2020 | Brebner ................. G06N 5/022 |
| 2020/0288284 | A1 * | 9/2020 | Klein .................... H04W 12/63 |
| 2021/0279953 | A1 | 9/2021 | Bouhnik et al. |
| 2021/0364298 | A1 * | 11/2021 | Gao ....................... G01S 5/0252 |
| 2022/0141619 | A1 | 5/2022 | Parikh et al. |

OTHER PUBLICATIONS

Ben-Hur et al., A User's Guide to Support Vector Machines, Ch. 13 in Methods in Molecular Biology (Clifton, N.J.), Jan. 2010, pp. 223-239.

Chen et al., High Accuracy Indoor Localization: A WiFi-based Approach, 2016 IEEE International Conference on Acoustics, Speech and Signal Processing (ICASSP), Shanghai, 2016, pp. 6245-6249, doi: 10.1109/ICASSP.2016.7472878.

Faragher et al., An Analysis of the Accuracy of Bluetooth Low Energy for Indoor Positioning Applications, Proceedings of the 27th International Technical Meeting of the Satellite Division of The Institute of Navigation (ION GNSS+ 2014), Sep. 8-12, 2014, pp. 201-210.

Faragher et al., Location Fingerprinting With Bluetooth Low Energy Beacons, IEEE Journal on Selected Areas in Communications, Nov. 2015, pp. 2418-2428, vol. 33, No. 11.

Final Office Action for U.S. Appl. No. 17/083,981 dated Jun. 13, 2022.

Han et al., A Visual Analytics System for Radio Frequency Fingerprinting-based Localization, Proceedings of the IEEE Symposium on Visual Analytics Science and Technology, IEEE Vast 2009, Atlantic City, New Jersey, USA, Oct. 11-16, 2009, part of VisWeek 2009, Jan. 2009, pp. 1-8.

He et al., Wi-Fi Fingerprint-Based Indoor Positioning: Recent Advances and Comparisons, IEEE Communications Survey & Tutorials, First Quarter 2016, pp. 466-490, vol. 18, No. 1.

Hu et al., WLAN location determination in e-home via support vector classification, Conference Paper / Feb. 2004, Proceedings of the 2004 IEEE International Conference on Networking, Sensing & Control, Taipei, Taiwan, Mar. 21-25, 2004, pp. 1026-1032.

Ibrahim et al., CNN based Indoor Localization using RSS Time-Series, Conference Paper IEEE ISCC At: Brazil, Jun. 2018, DOI: 10.1109/ISCC.2018.8538530, pp. 1-7.

Jang et al., Indoor Positioning Technologies Without Offline Fingerprinting Map: A Survey, IEEE Communications Surveys & Tutorials, First Quarter 2019, pp. 508-525, vol. 21, No. 1.

Kennedy et al., Topic Models for RFID Data Modeling and Localization, 2017 IEEE Intl Conference on Big Data, pp. 1438-1445 (2017).

Non-final Office Action for U.S. Appl. No. 17/083,981 dated Oct. 17, 2022.

Non-final Office Action for U.S. Appl. No. 17/083,981 dated Oct. 21, 2021.

Non-final Office Action for U.S. Appl. No. 17/083,981 dated Oct. 24, 2023.

Paek et al., A Measurement Study of BLE iBeacon and Geometric Adjustment Scheme for Indoor Location-Based Mobile Application, Mobile Information Systems, Hindawi Publishing Corporation, vol. 2016, Article ID 8367638, http://dx.doi.org/10.1155/2016/8367638, pp. 1-13.

Raghavan et al., Accurate Mobile Robot Localization in indoor environments using Bluetooth, 2010 IEEE International Conference on Robotics and Automation, Anchorage Convention District, May 3-8, 2010, Anchorage, Alaska, USA, pp. 4391-4396.

Simonoff et al., Intra-Spacecraft RFID Localization, 2021 IEEE Intl Conference on RFID, 8 pp. (pages not numbered).

Wen et al., "Indoor Localization algorithm based on artificial neural network and radio-frequency identificiation reference tags", Advances in Mechanical Engineering, 2018, vol. 10(12) 1-12.

Wu et al., WILL: Wireless Indoor Localization Without Site Survey, publication and date unknown, believed to be earlier preprint of NPL7, above.

Zhu et al., RSSI Based Bluetooth Low Energy Indoor Positioning, 2014 International Conference on Indoor Positioning and Indoor Navigation, Oct. 27-30, 2014, pp. 526-533.

Zhu et al., RSSI-based Algorithm for Indoor Localization, Communications and Network, 2013, 5, 37-42, doi:10.4236/cn.2013. 52B007 Published Online May 2013 (http://www.scirp.org/journal/cn).

Non-Final Office Action for U.S. Appl. No. 17/959,422 dated Feb. 26, 2025.

Final Office Action for U.S. Appl. No. 17/959,422 dated Jun. 16, 2025.

\* cited by examiner

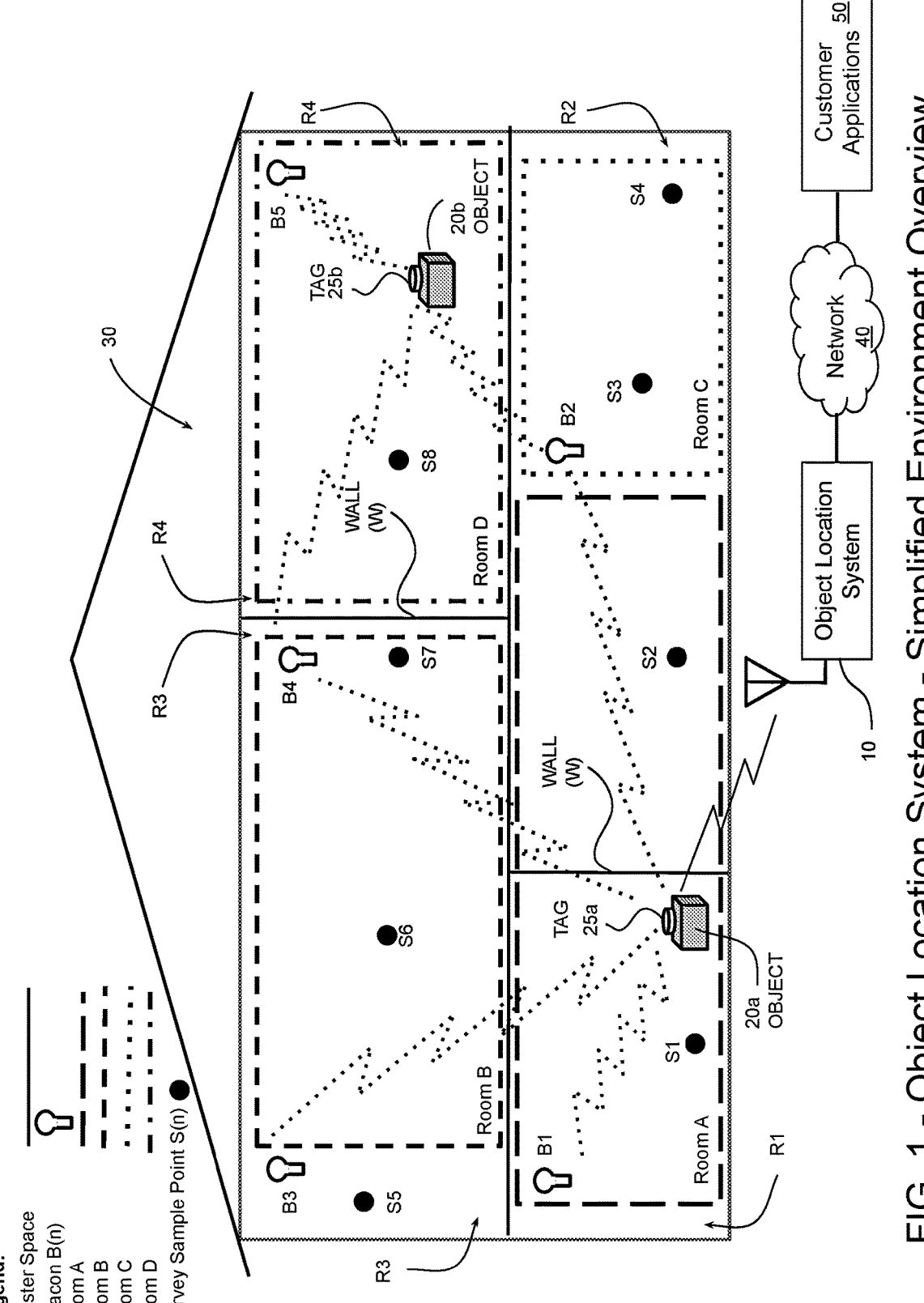
FIG. 1 - Object Location System - Simplified Environment Overview

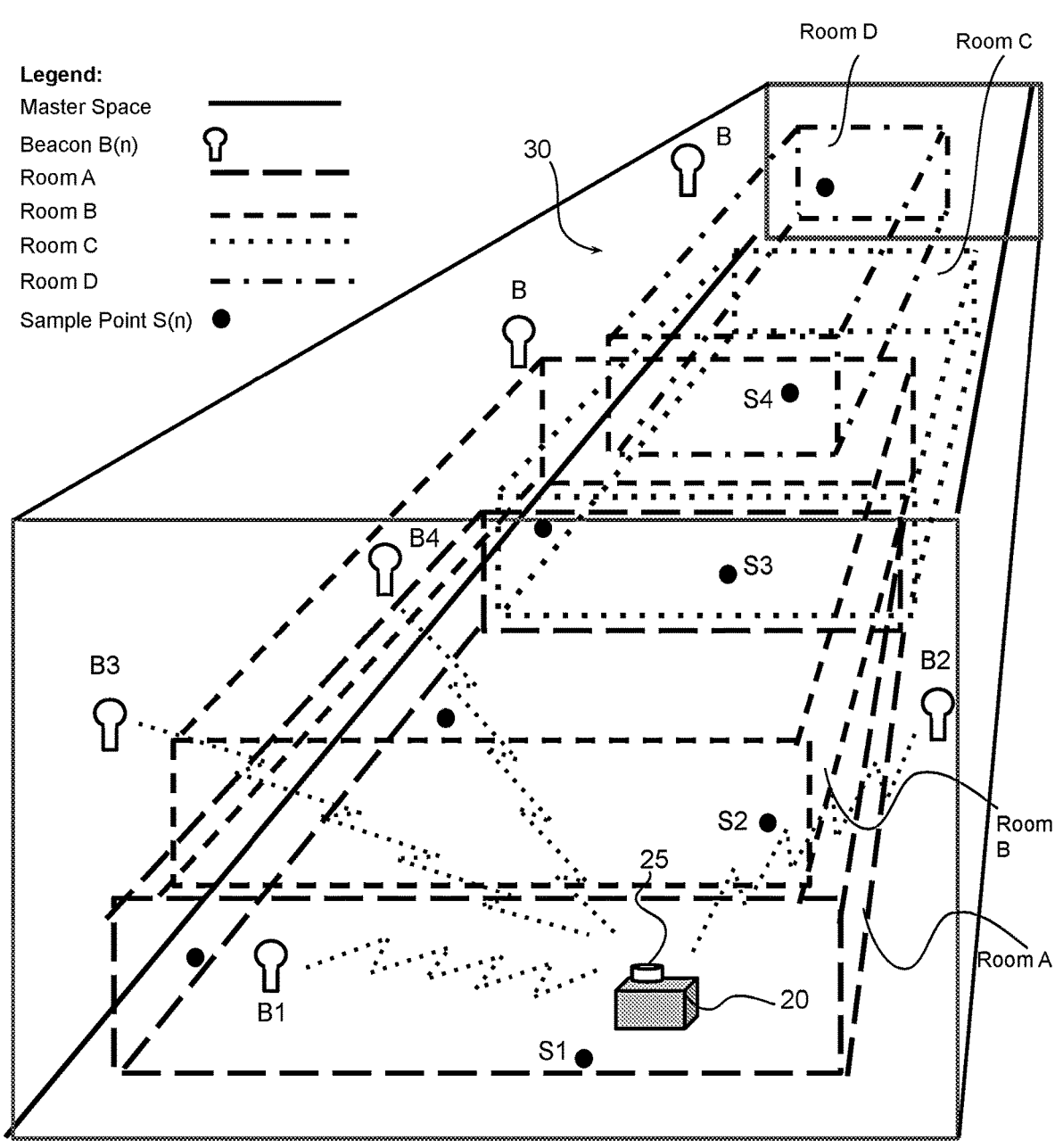
FIG. 2 - Object Location System - 3D
Environment Overview

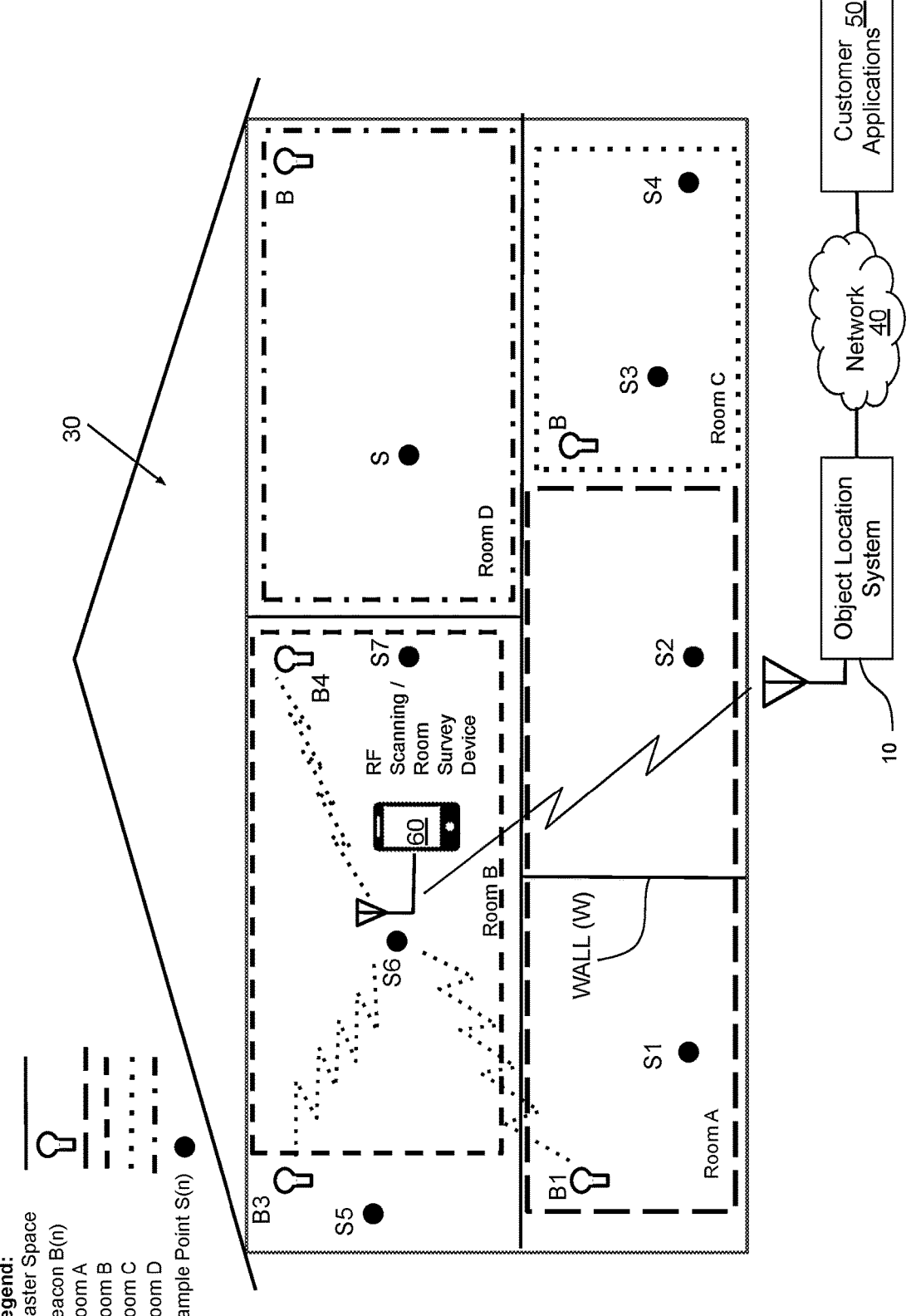
FIG. 3 – Object Location System – Exemplary Initial Scan of Environment

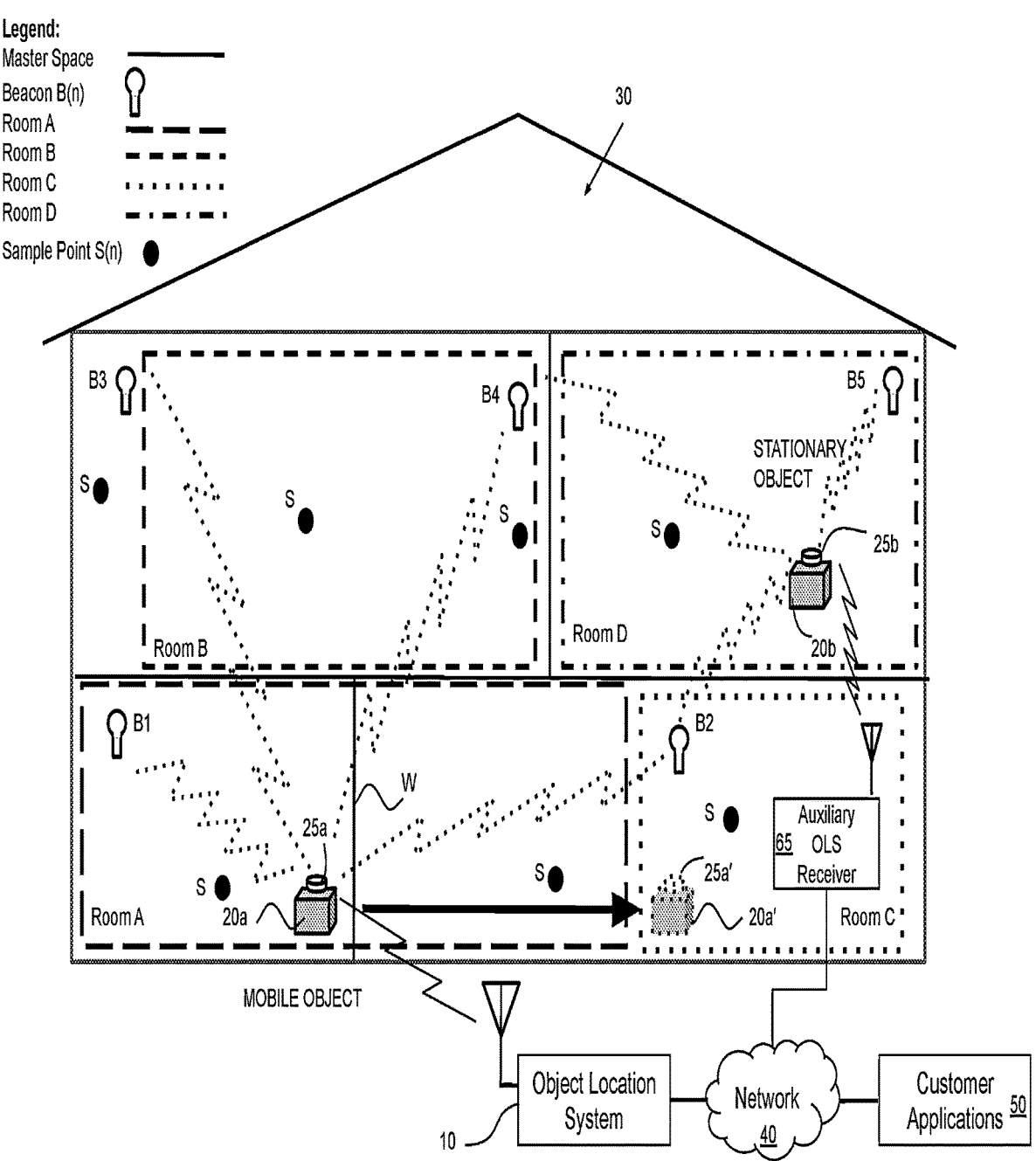
FIG. 4 - Object Location System - Stationary & Moving/Mobile Object

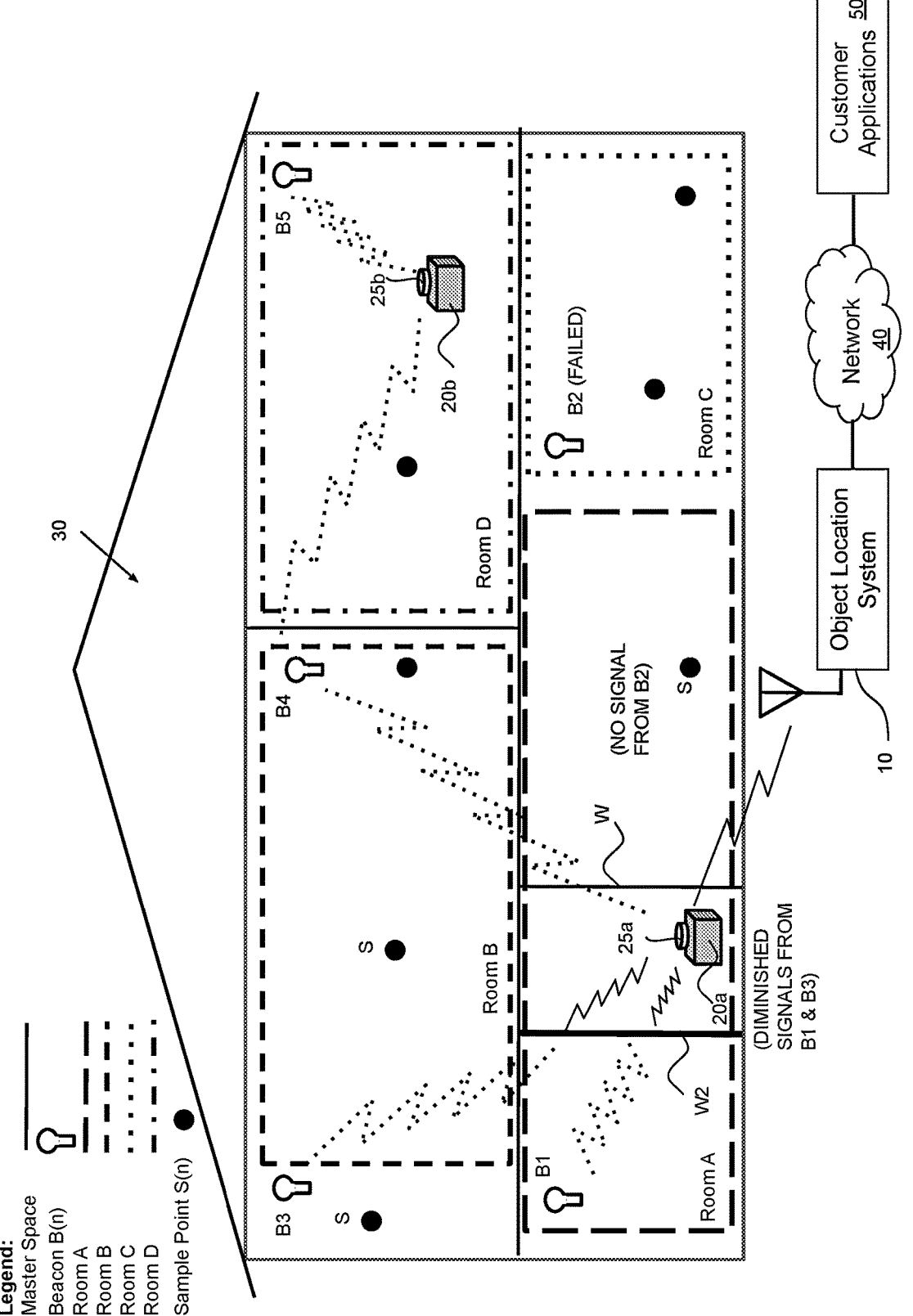
FIG. 5 - Object Location System - Altered RF Environment

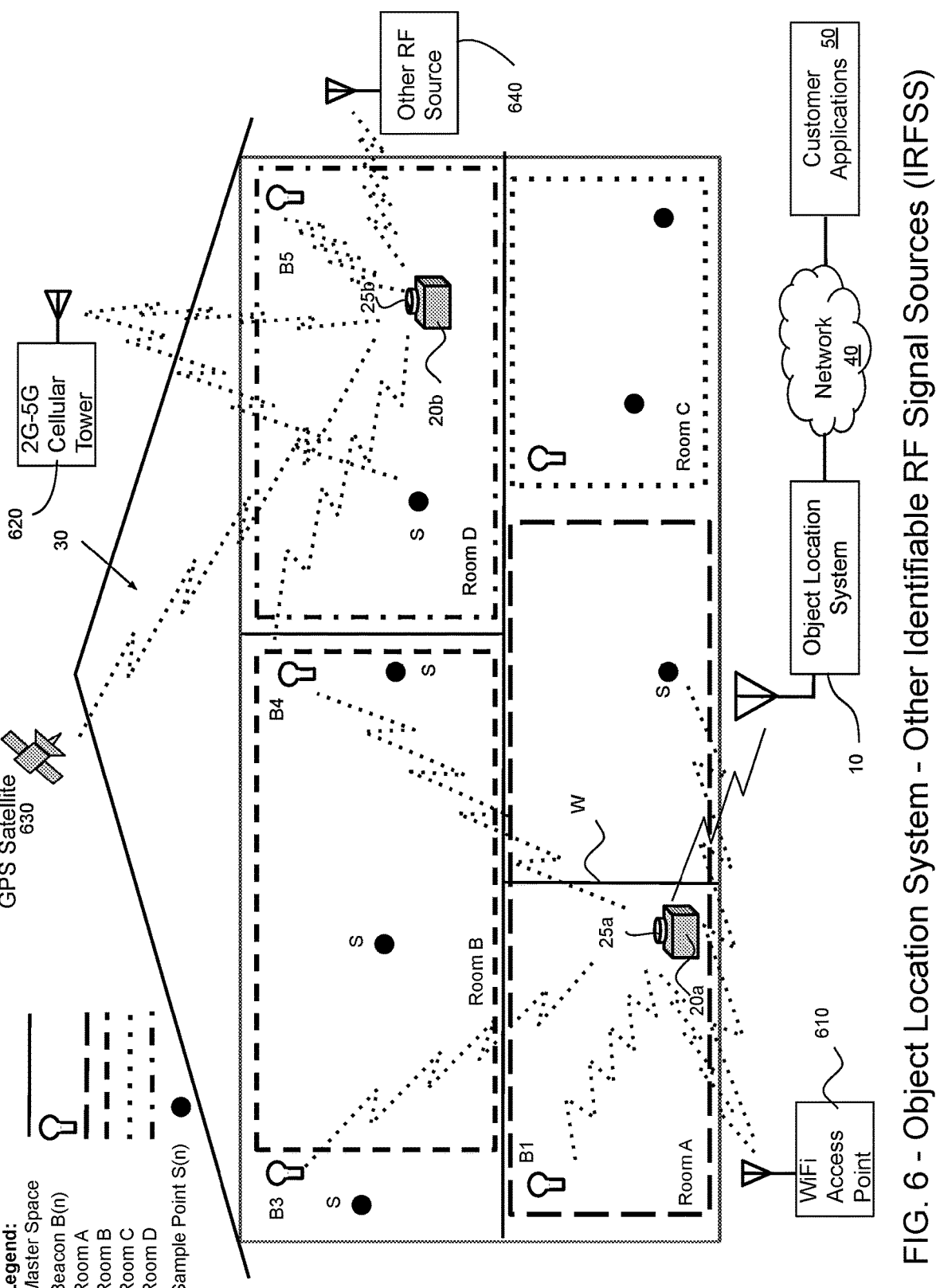
FIG. 6 - Object Location System - Other Identifiable RF Signal Sources (IRFSS)

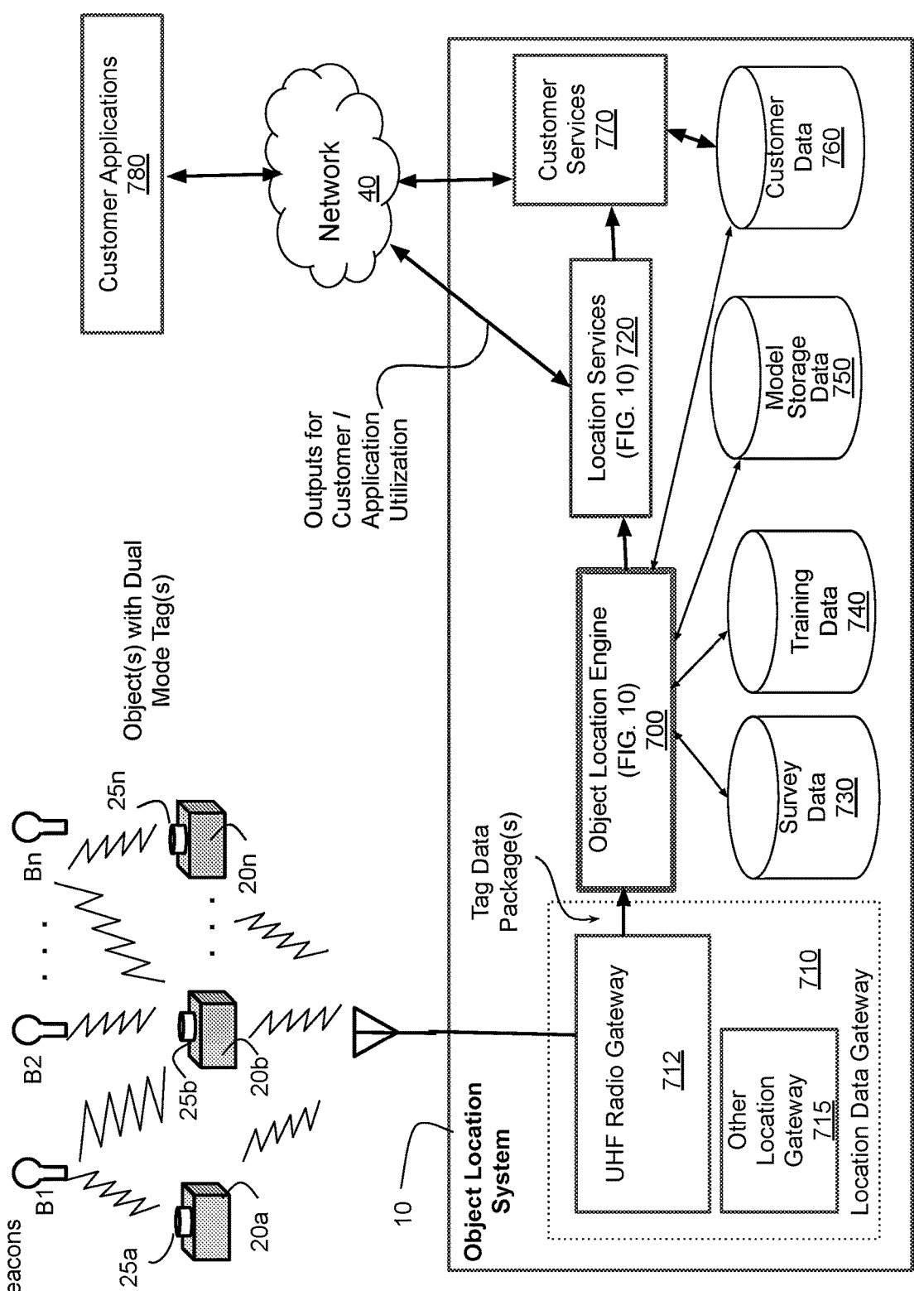
FIG. 7 - Object Location System Block Diagram

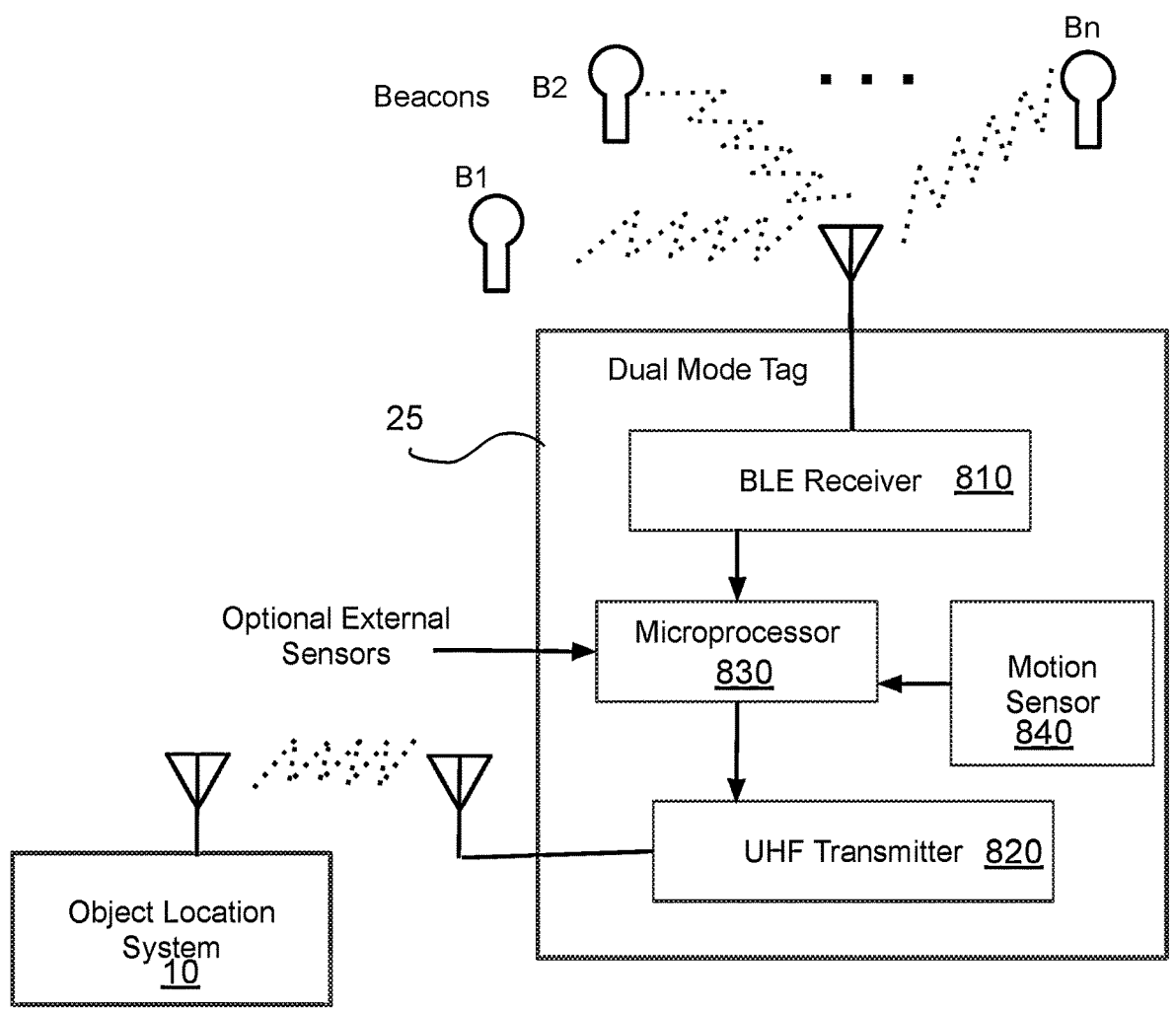
FIG. 8 - Dual Mode RF Tag Block Diagram

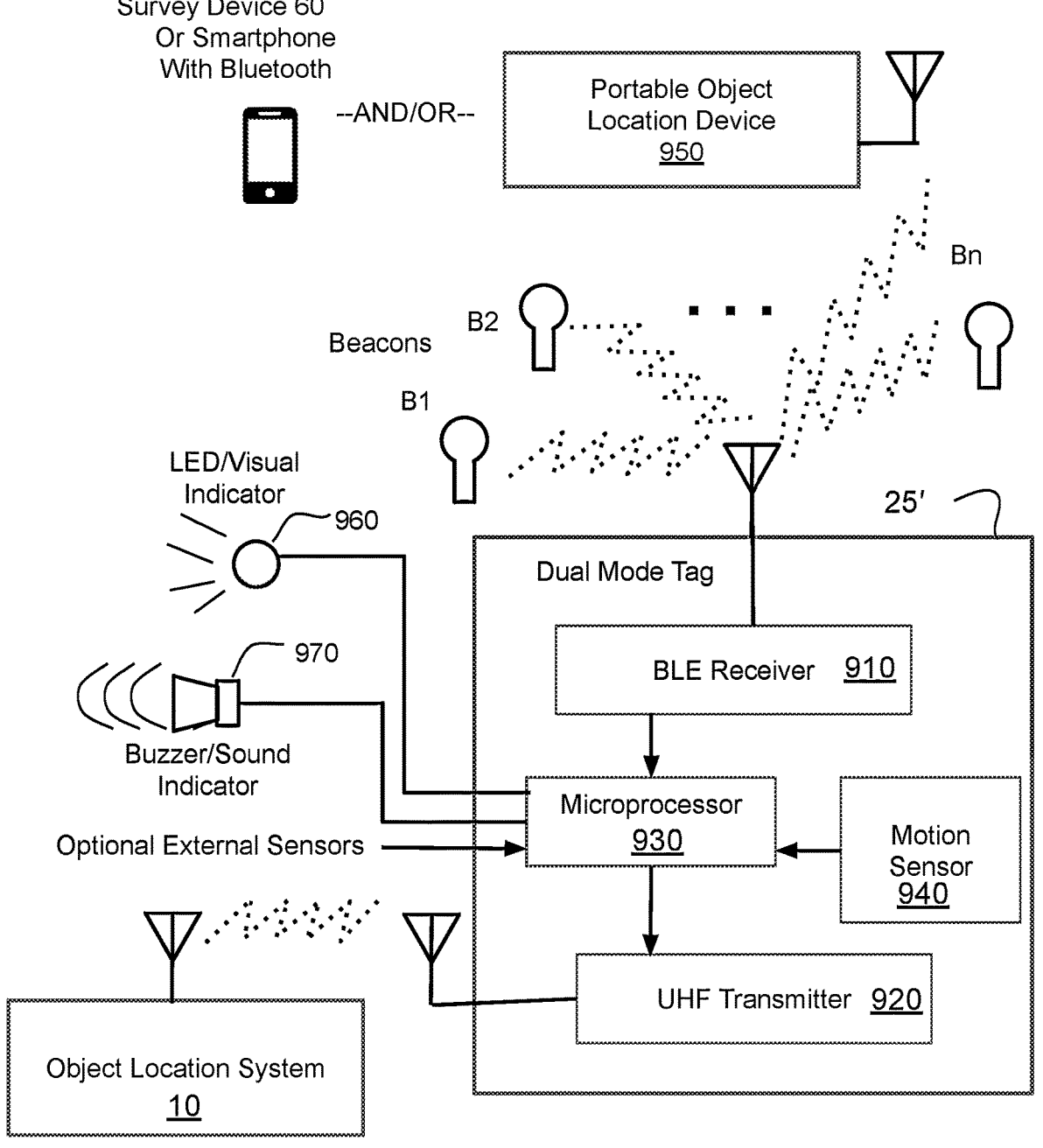
FIG. 9 - Dual Mode RF Tag Block Diagram
For Proximity or "Last 10 Feet Detection"

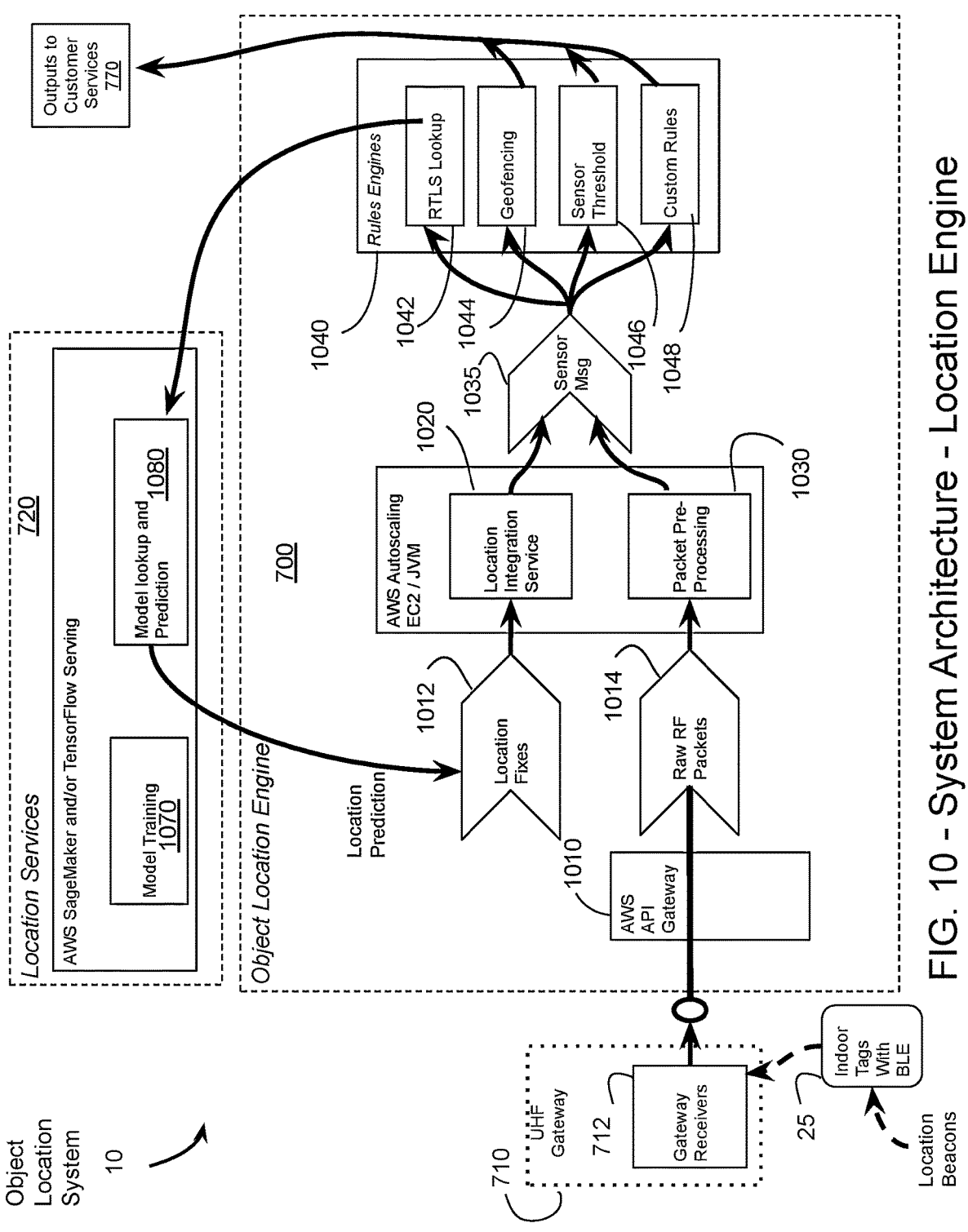
FIG. 10 – System Architecture – Location Engine

NOTE: each row = a "scan" comprising multiple samples Sn

| S1 | | | | S2 | | S3 | | | Room | Model |
|---|---|---|---|---|---|---|---|---|---|---|
| -70 | -68 | -69 | -50 | -50 | -51 | -100 | -100 | -100 | Room A | Model A |
| -69 | -68 | -71 | -52 | -52 | -100 | -30 | -100 | -100 | Room A | Model A |
| -52 | -51 | -49 | -71 | -71 | -72 | -50 | -49 | -50 | Room B | Model B |
| -47 | -48 | -51 | -68 | -68 | -69 | -100 | -45 | -100 | Room B | Model B |
| -100 | -100 | -100 | -50 | -50 | -51 | -85 | -86 | -89 | Room C | Model C |
| -100 | -100 | -20 | -47 | -47 | -48 | -90 | -86 | -89 | Room C | Model C |
| -100 | -100 | -100 | -50 | -50 | -51 | -91 | -89 | -92 | Room C | Model C |

FIG. 11A - Exemplary Training Data

Scans

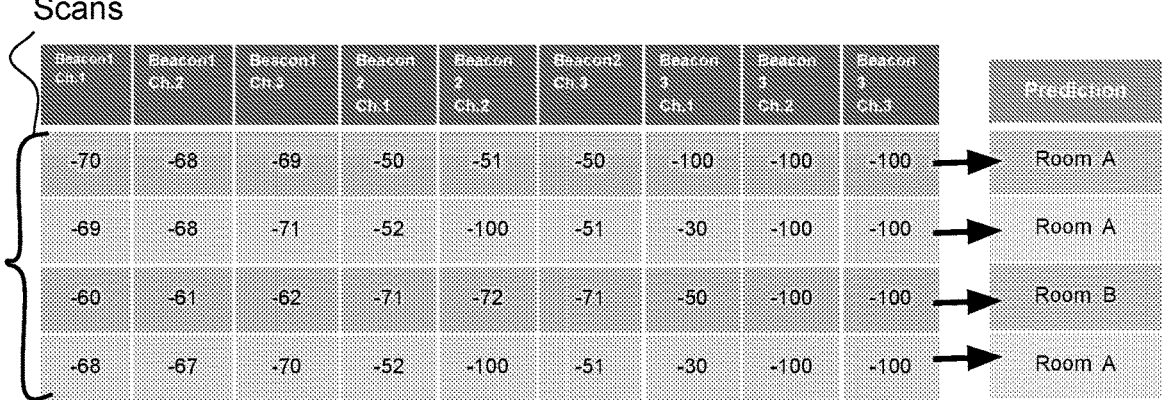

Final Prediction = Room A as 3 out of 4 scans predicted Room A

FIG. 11B - Exemplary Object Location Prediction Data

Initial
Scans

| Beacon1 Ch.1 | Beacon1 Ch.2 | Beacon1 Ch.3 | Beacon2 Ch.1 | Beacon2 Ch.2 | Beacon2 Ch.3 | Beacon3 Ch.1 | Beacon3 Ch.2 | Beacon3 Ch.1 | Prediction |
|---|---|---|---|---|---|---|---|---|---|
| -70 | -68 | -69 | -50 | -51 | -50 | -100 | -100 | -100 | Room A |
| -69 | -68 | -71 | -52 | -100 | -51 | -30 | -100 | -100 | Room A |
| -60 | -61 | -62 | -71 | -72 | -71 | -50 | -100 | -100 | Room B |
| -68 | -67 | -70 | -52 | -100 | -51 | -30 | -100 | -100 | Room A |
| -66 | -69 | -67 | -53 | -49 | -52 | -100 | -100 | -100 | Room A |
| -66 | -67 | -70 | -52 | -54 | -51 | -100 | -100 | -100 | Room B |

Additional
Scan data

Additional scans from known static objects, confirmed object tag
location operations, triggered environment changes, followup surveys,
beacon failures, diminished RF signals, moved or replaced beacons,
added or removed additional IRFSS, etc. used to update, reinforce,
and/or maintain data model

FIG. 11C - Exemplary Object Location Data Update /
Model Maintenance / Reinforcement Initial survey database

| Survey Scans (Scan ID) | B1 | B2 | B3 | B4 | B5 | B6 | B7 | B8 | B9 | B10 | Room Label |
|---|---|---|---|---|---|---|---|---|---|---|---|
| S1 | -99 | -94 | 0 | 0 | 0 | 0 | -120 | -118 | -50 | -49 | R1 |
| S2 | -98 | -94 | -135 | 0 | 0 | 0 | -119 | 0 | -49 | -50 | R1 |
| S3 | -99 | -93 | -145 | 0 | 0 | 0 | -120 | -116 | -50 | -49 | R1 |
| S4 | 0 | 0 | -70 | -69 | -98 | -97 | 0 | 0 | 0 | 0 | R2 |
| S5 | 0 | 0 | -71 | -68 | -97 | -98 | 0 | 0 | 0 | 0 | R2 |
| S6 | 0 | 0 | -70 | -69 | -98 | -97 | 0 | -125 | 0 | 0 | R2 |
| S7 | -50 | -46 | 0 | 0 | 0 | 0 | -98 | -97 | -95 | 0 | R3 |
| S8 | -51 | -47 | 0 | 0 | 0 | 0 | 0 | -98 | -97 | 0 | R3 |
| S9 | -48 | -45 | 0 | 0 | 0 | 0 | -96 | -94 | -93 | 0 | R3 |

Survey process: exemplary data collected in scans Sn collected from beacons Bn in indicated rooms identified by Room Label Rn as result of survey scan within the identified room; associate Room Label with Scan ID.

NOTE zero values received from beacons B4, B5, B6 in Room R1 and R3
NOTE zero or weak (< -120 dB) values received from beacon B3 in Room R1 and R3

FIG. 12A - Exemplary Initial Survey Data (Schema)

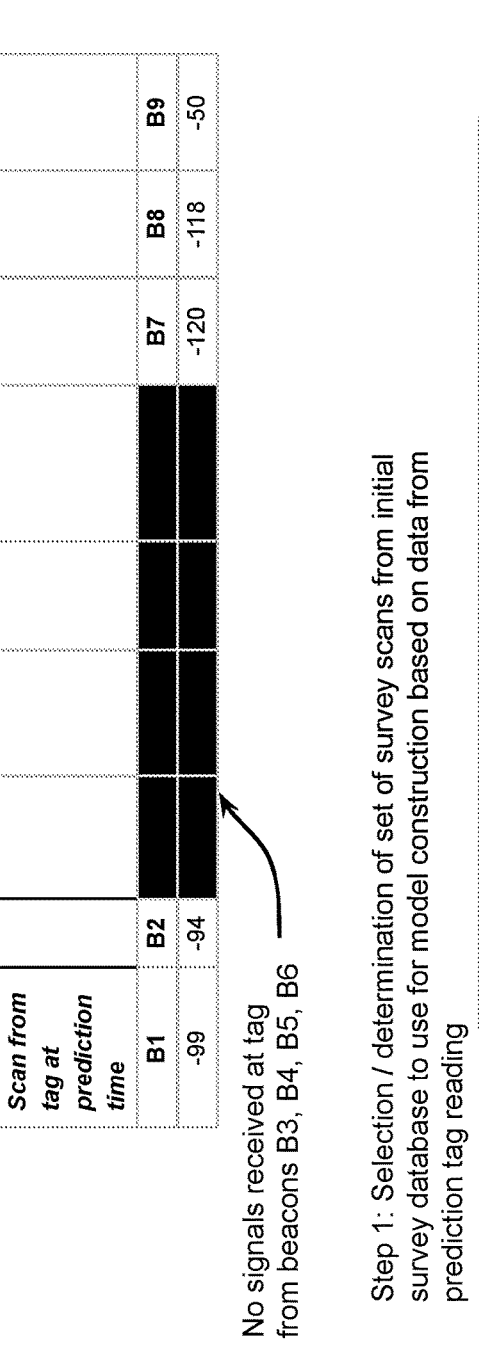

| Scan from tag at prediction time | | | | | | |
| --- | --- | --- | --- | --- | --- | --- |
| B1 | B2 | | | B7 | B8 | B9 |
| -99 | -94 | | | -120 | -118 | -50 |

No signals received at tag from beacons B3, B4, B5, B6

Step 1: Selection / determination of set of survey scans from initial survey database to use for model construction based on data from prediction tag reading

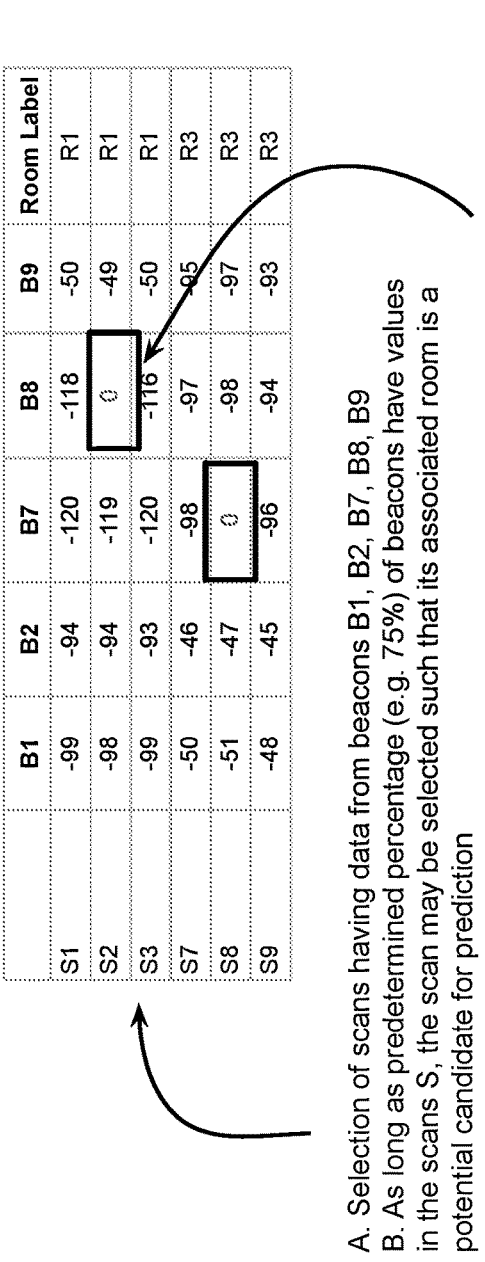

| | B1 | B2 | B7 | B8 | B9 | Room Label |
| --- | --- | --- | --- | --- | --- | --- |
| S1 | -99 | -94 | -120 | -118 | -50 | R1 |
| S2 | -98 | -94 | -119 | 0 | -49 | R1 |
| S3 | -99 | -93 | -120 | -116 | -50 | R1 |
| S7 | -50 | -46 | -98 | -97 | -95 | R3 |
| S8 | -51 | -47 | 0 | -98 | -97 | R3 |
| S9 | -48 | -45 | -96 | -94 | -93 | R3 |

A. Selection of scans having data from beacons B1, B2, B7, B8, B9
B. As long as predetermined percentage (e.g. 75%) of beacons have values in the scans S, the scan may be selected such that its associated room is a potential candidate for prediction Zero values (i.e. no signal received from beacon B8 in scan S2 in room R1; likewise for beacon B7 in S8 in R3

FIG. 12B - Exemplary Training Data (Schema)

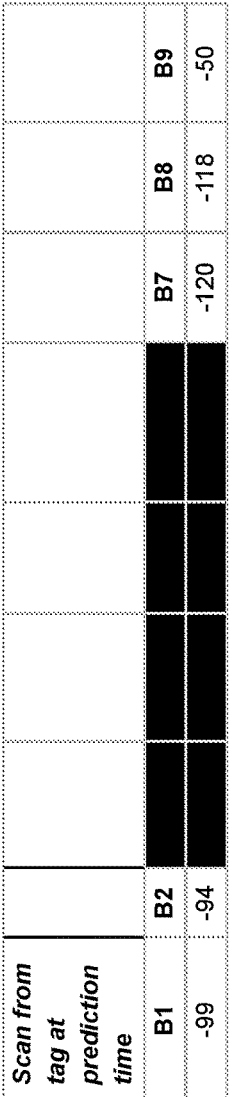
| Scan from tag at prediction time | | | B7 | B8 | B9 |
|---|---|---|---|---|---|
| B1 | B2 | | -120 | -118 | -50 |
| -99 | -94 | | | | |
Step 2: fill in missing (zero) values for scans using a selected statistical method, e.g. average of adjacent scans; establish model(s) using selected scans
| | B1 | B2 | B7 | B8 | B9 | Room Label |
|---|---|---|---|---|---|---|
| S1 | -99 | -94 | -120 | -118 | -50 | R1 |
| S2 | -98 | -94 | -119 | -117 | -49 | R1 |
| S3 | -99 | -93 | -120 | -116 | -50 | R1 |
| S7 | -50 | -46 | -98 | -97 | -95 | R3 |
| S8 | -51 | -47 | -97 | -98 | -97 | R3 |
| S9 | -48 | -45 | -96 | -94 | -93 | R3 |
FIG. 12C - Exemplary Model Construction - Data Adjustment (Schema)

Figure 12D:
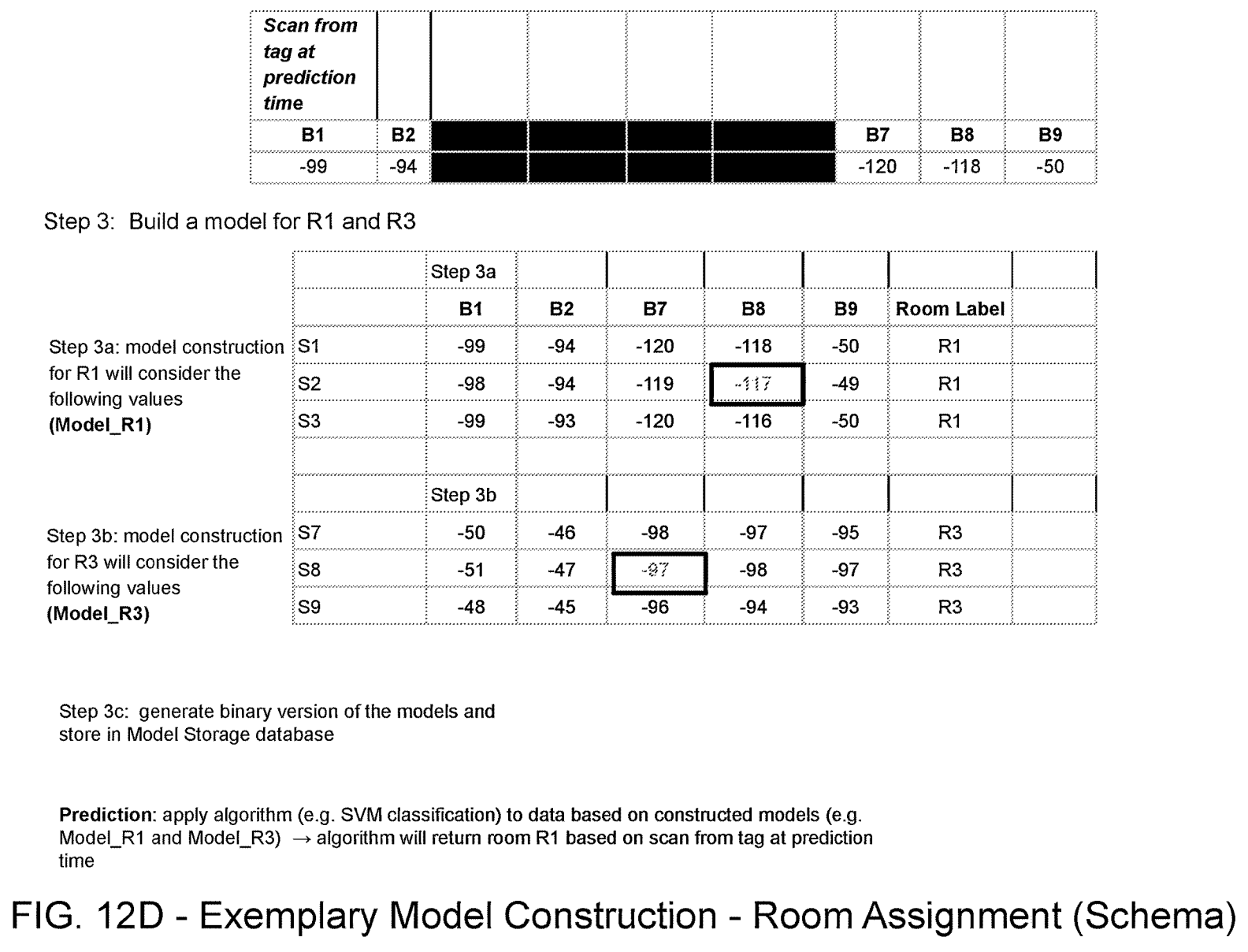

*Scan from tag at prediction time*

| | B1 | B2 | | | | B7 | B8 | B9 |
|---|---|---|---|---|---|---|---|---|
| | -99 | -94 | | | | -120 | -118 | -50 |

Step 3: Build a model for R1 and R3

Step 3a

| | B1 | B2 | B7 | B8 | B9 | Room Label |
|---|---|---|---|---|---|---|
| S1 | -99 | -94 | -120 | -118 | -50 | R1 |
| S2 | -98 | -94 | -119 | -117 | -49 | R1 |
| S3 | -99 | -93 | -120 | -116 | -50 | R1 |

Step 3b

| | B1 | B2 | B7 | B8 | B9 | |
|---|---|---|---|---|---|---|
| S7 | -50 | -46 | -98 | -97 | -95 | R3 |
| S8 | -51 | -47 | -97 | -98 | -97 | R3 |
| S9 | -48 | -45 | -96 | -94 | -93 | R3 |

Step 3a: model construction for R1 will consider the following values (Model_R1)

Step 3b: model construction for R3 will consider the following values (Model_R3)

Step 3c: generate binary version of the models and store in Model Storage database

Prediction: apply algorithm (e.g. SVM classification) to data based on constructed models (e.g. Model_R1 and Model_R3) → algorithm will return room R1 based on scan from tag at prediction time FIG. 12D - Exemplary Model Construction - Room Assignment (Schema)

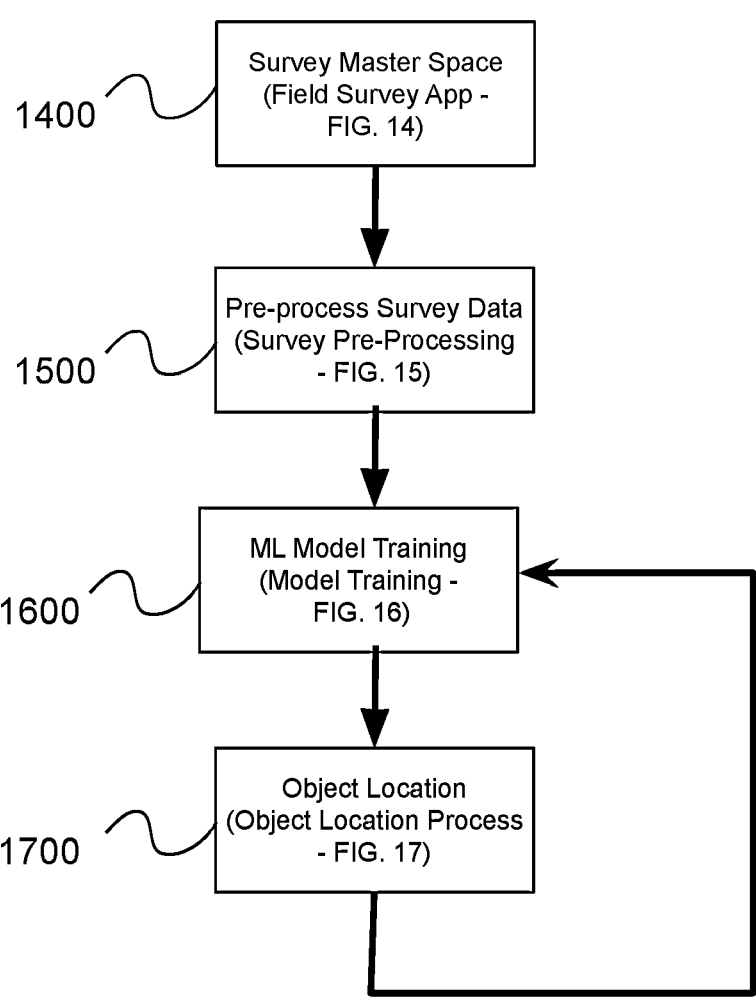
FIG. 13 - System High Level Flow Chart

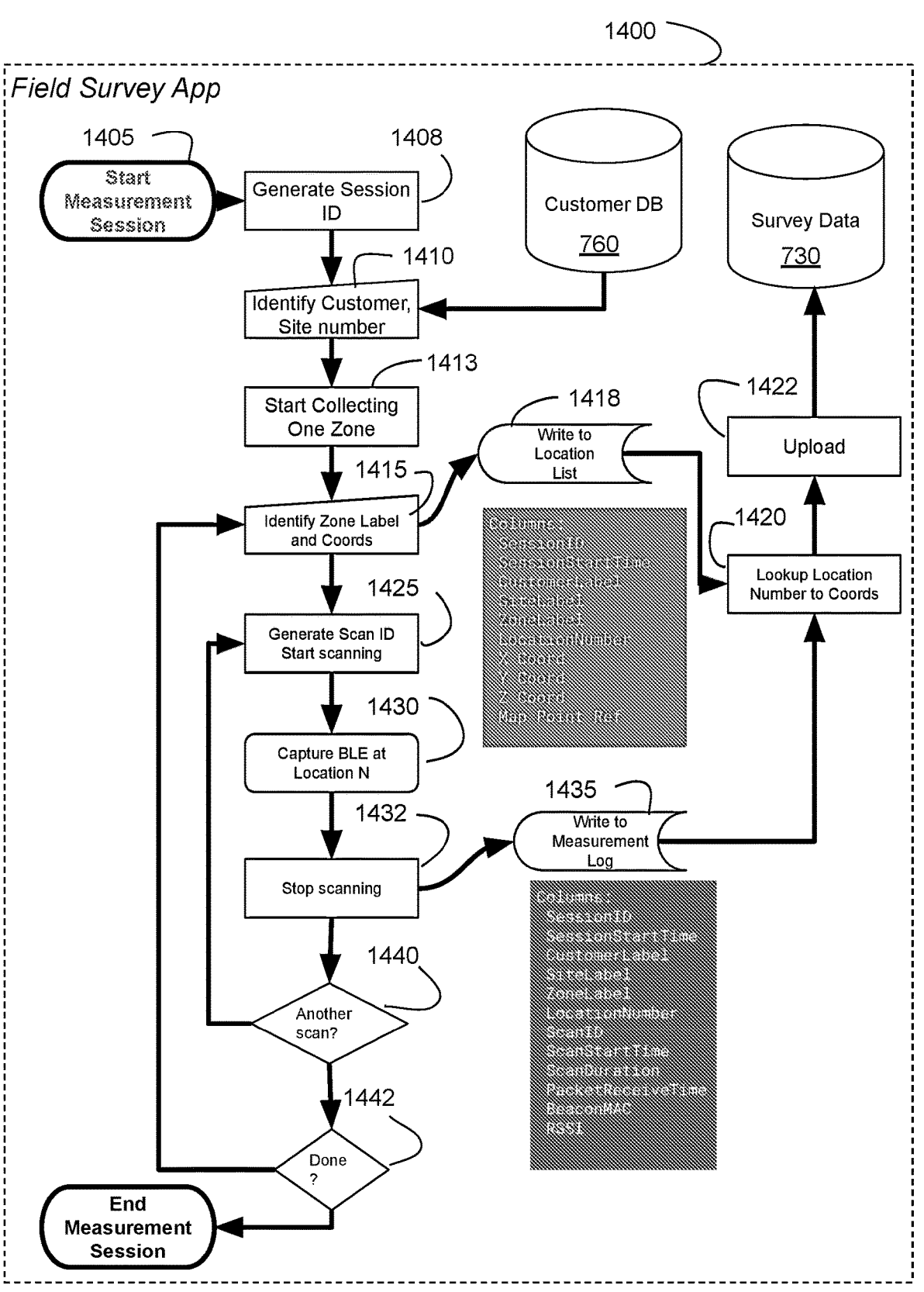
FIG. 14 - Survey Flow Chart

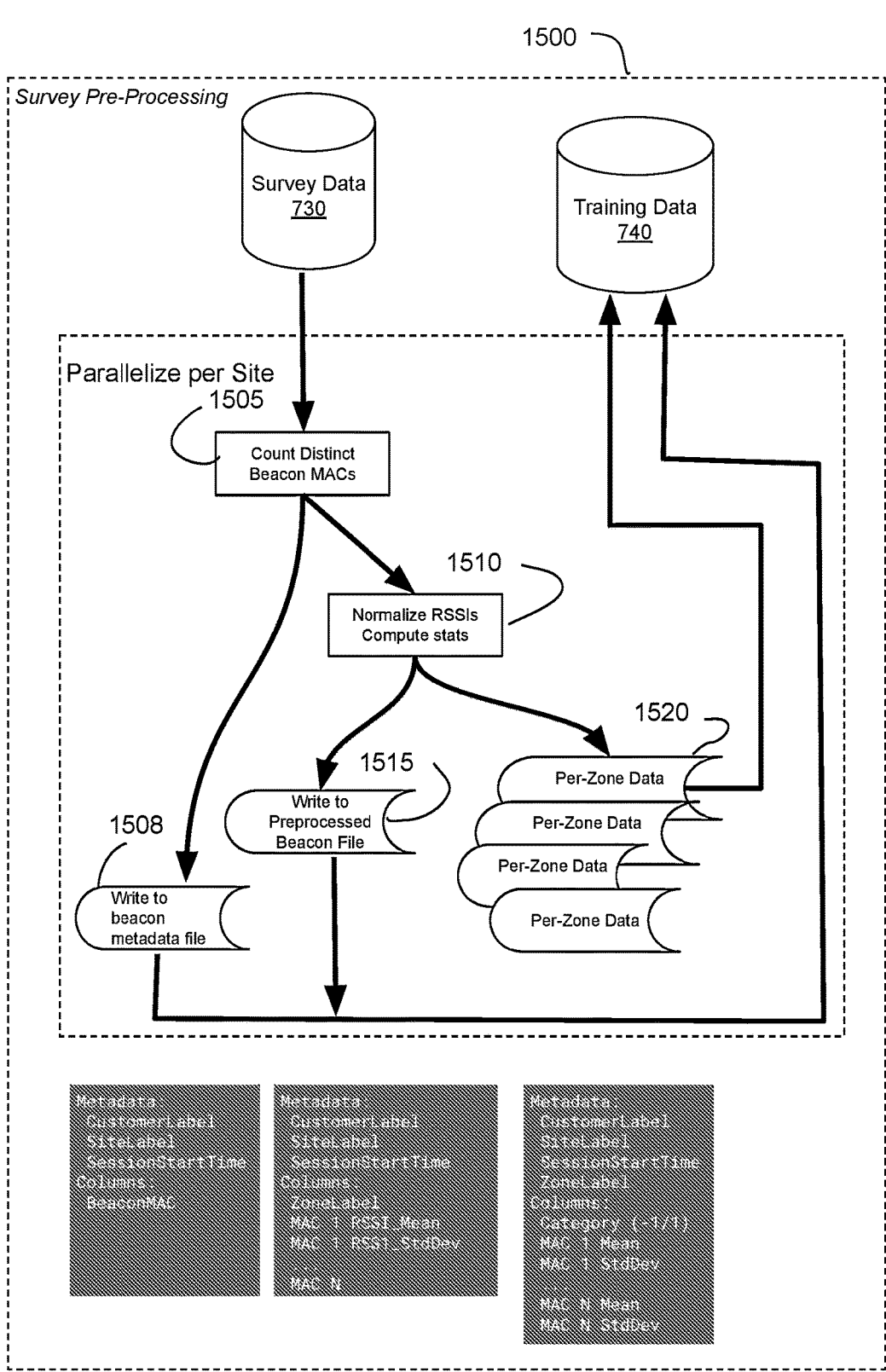
FIG. 15 - Survey Data Pre-Processing Process

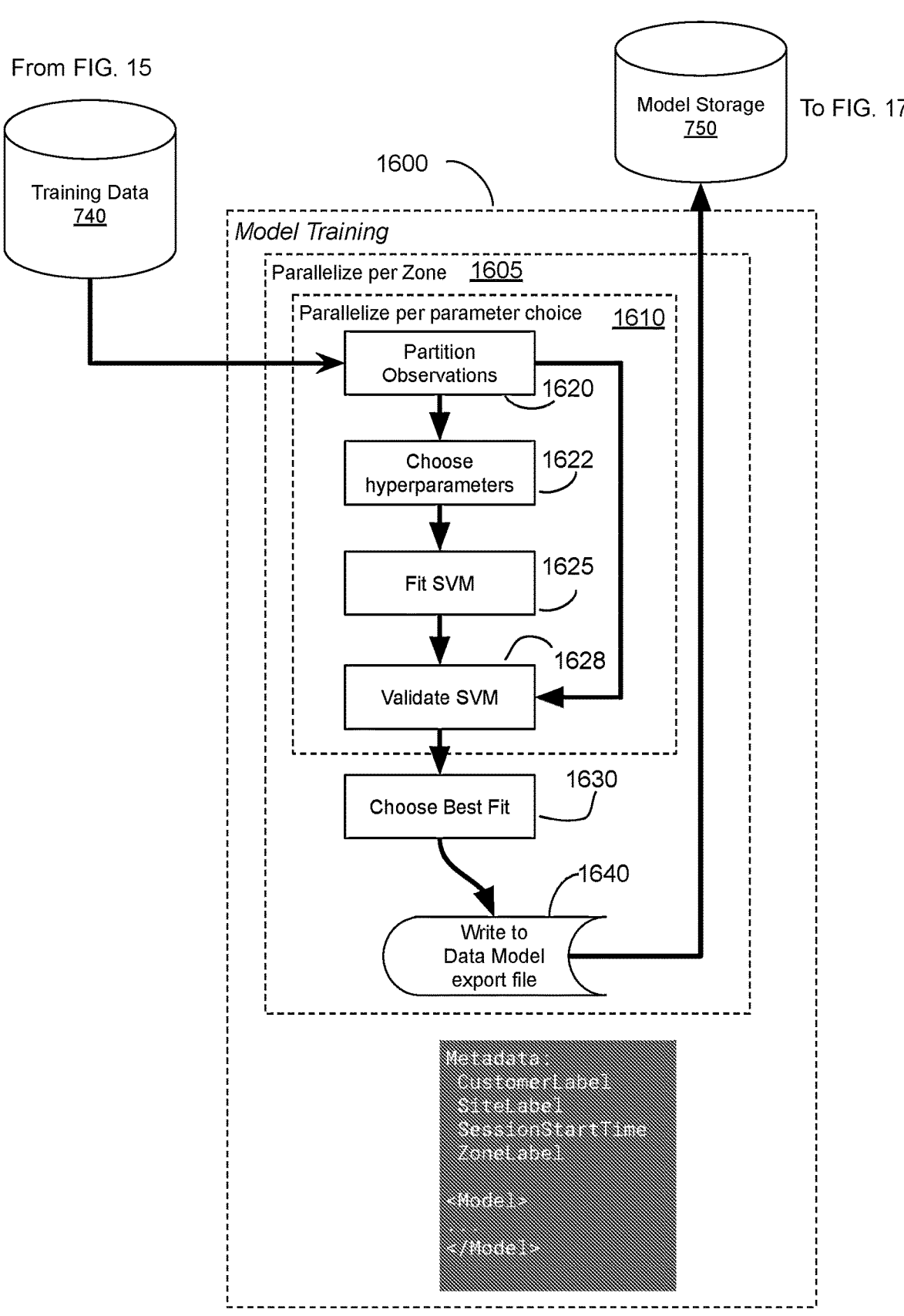
FIG. 16 - ML Model Training Process

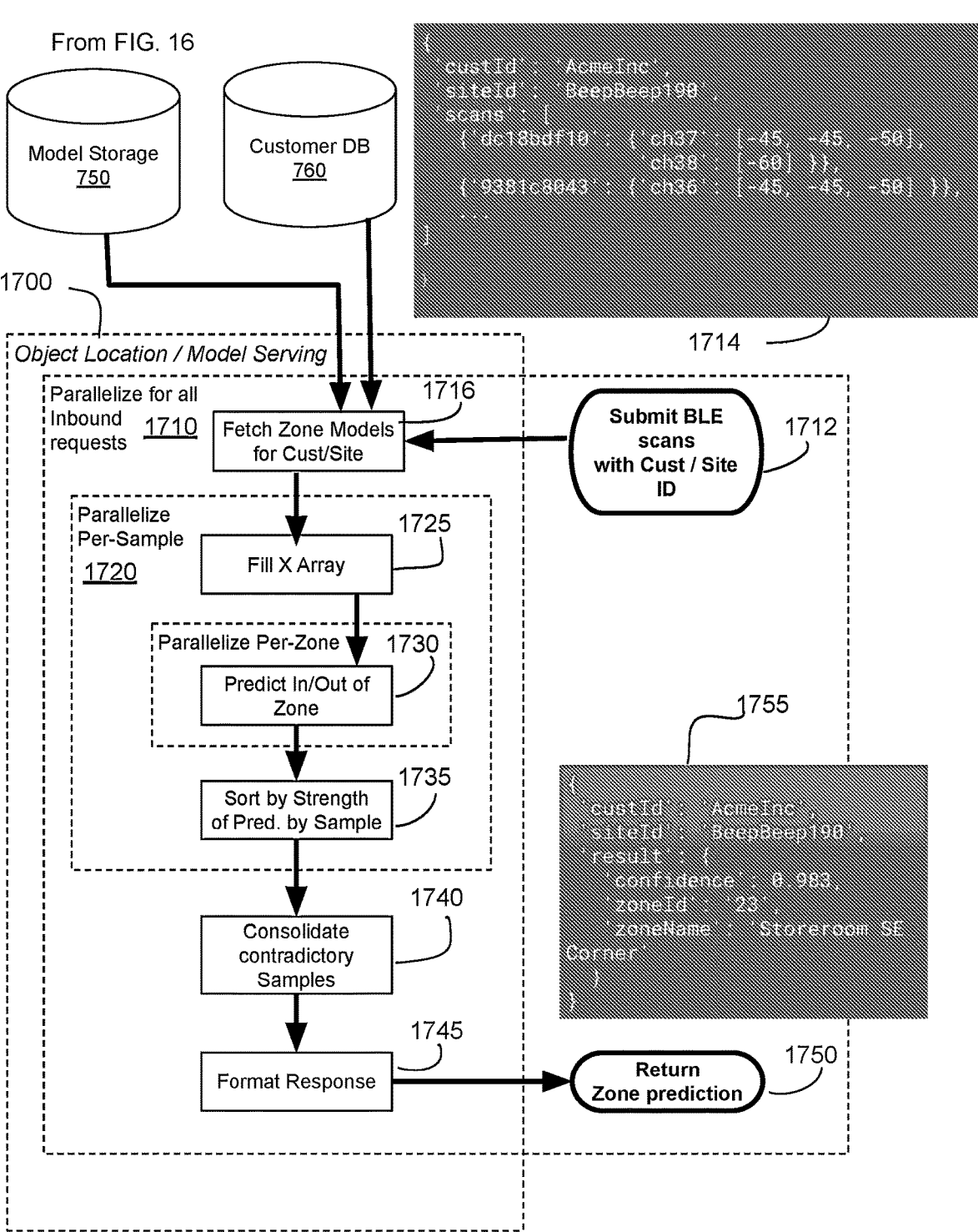
FIG. 17 - Object Location (Model Serving) Process

METHOD AND SYSTEM FOR LOCATING OBJECTS WITHIN A MASTER SPACE USING MACHINE LEARNING ON RF RADIOLOCATION

CROSS REFERENCE TO RELATED APPLICATION(S)

This application is a continuation of U.S. patent application Ser. No. 17/959,422, filed on Oct. 4, 2022, which is a continuation-in-part of U.S. patent application Ser. No. 17/083,981, filed on Oct. 29, 2020, each of which is incorporated herein by reference in their entirety.

TECHNICAL FIELD

The present disclosure and claimed inventions relate generally to radiolocation, and relate more specifically to the location of objects in particular zones (rooms, subspaces, areas, etc.) of a master space such as a building, equipment lot, warehouse, etc. using the detected characteristics of radio signals such as beacons distributed within or near the master space.

BACKGROUND

Knowing the location of specific assets or object within a spatial environment is an important aspect of present-day logistics, healthcare, and other industries. For example, in a logistics environment such as a warehouse of products, a commercial organization needs to know the location of specific objects such as pallets or individual product packages for purposes of retrieval and shipment. As another example, a healthcare facility such as a hospital needs to know the location of specific assets such as respirators, gurneys, ECG machines, or other items for purposes of repositioning the assets where a need exists. As another example, a storage lot of movable vehicles or equipment (e.g. automobiles, construction equipment, military assets) may have multiple objects whose locations need to be tracked for sales, maintenance or service, deployment for missions or jobs, etc.

Certain types of objects are highly mobile and require real-time tracking. For example, tracking the location of people usually requires use of actively radio frequency (RF) radiating devices such as pagers, mobile telephones, active RFID tags, active transmitting tags, etc., with the necessary placement of significant and costly tracking infrastructure and networks. Various "active RF" object location systems are known in the art. Although perhaps not generally representative of real time "active RF" location system, U.S. Pat. No. 8,957,812 to Hill et al.

describes a position tracking system using radio signals coupled with inertial sensing. This system involves a transmitter on each located asset and uses a plurality of receiver antennas to receive a device's radio signal at each antenna.

Active RF location systems (such as described in the Hill et al. patent in some respects) typically involve use of RF transmitters that activate frequently to provide position information frequently if not in real time, require costly infrastructure such as access points or locators that must be supplied with power and network connections, use less accurate techniques such as time difference of arrival (TDOA) of signals, are prone to multipath errors, use more accurate ultrawideband technologies that have limited range or significant power consumption, or have a number of other drawbacks, Other objects such as product pallets and medical equipment, although mobile, tend to remain stationary for significant periods of time, and may be in an environment (such as a warehouse with multiple levels of racks or shelves, or a multi-roomed or multi-story building) where networking infrastructure and actively radiating tracking devices are costly to install and difficult to maintain. For example, an asset tracking device that is frequently turning on and off a radio frequency (RF) transmitter demands high energy usage and thus frequent battery charging and/or replacement. In addition, such systems require placement of receiving and transmitting equipment within the spatial environment with special attention to the frequency and bandwidth of the RF communication channels.

Furthermore, spatial environments can change over time, due to the addition of walls and doors, equipment failure, communication infrastructure changes, and/or placement of RF-blocking objects or "Faraday cage" type obstacles in the RF signal path of active RF transmitting object location. Changes in the spatial environment or infrastructure can impede the reliability of object location that uses active RF transmitting approaches.

It is known to use the Bluetooth Low Energy (BLE) radio technology embedded into radio beacons for purposes of indoor location applications. BLE technology is easy to deploy, relatively low cost, and enjoys wide support on consumer devices such as headphones, audio speakers, keyboards, home automation, and the like.

Some known location applications implement co-ordinate location estimated by radio "fingerprinting" techniques applied to Received Signal Strength Indicator (RSSI) data values received from BLE beacons. Fingerprinting techniques involve the determination of specific identifying properties about the BLE signals based solely on the strength of multiple signals received by a device (such as a consumer cellphone) that possesses a BLE receiver. Although fingerprinting techniques allow a crude triangulation type location of a device, fingerprinting techniques are susceptible to changes in the RF environment that affect the unique "signature" or fingerprint of a group of BLE beacons. In other words, if a BLE beacon used for radiolocation is moved, or fails, or is subjected to interference from external RF sources, or is obstructed by metallic objects or "Faraday cage" type obstacles in the signal path from a BLE beacon to a BLE receiver.

More recent radiolocation systems involve the use of artificial intelligence (AI), machine learning approaches to "learn" an environment and adapt to certain changes. For example, the paper by Wen et al., "Indoor localization algorithm based an artificial neural network and radio-frequency identification reference tags", *Advances in Mechanical Engineering*, Vol. 10(12) 1-12 (2018), describes an indoor radio-frequency identification localization algorithm based on received signal strength indication (RSSI) technology from a plurality of reference tags containing RF transmitters; the coordinates of the reference tags are known. By comparing different RSSI values between tracking tags and reference tags, the coordinate values of tracking tags can be estimated. The Wen et al. paper proposes using the RSSI value of reference tags and the actual known coordinates of reference tags to train an artificial neural network (ANN) to determine tracking tag location, in particular involving "back propagation" (BP) characteristics of radio signals from the tags to adjust for changes in the RF environment.

However, the Wen et al. system involves placing a large number of RFID reference tags into an array in a space, e.g. shelves in a warehouse, placing similar RFID tracking tags on objects to be located in the space, and using multiple readers to interrogate the reference tags and tracking tags. The system involves detecting multi-path reflections (back propagation) of signals from the tags and using a neural network on data representing multi-path effects to obtain high location accuracy. Although a system described in this paper might be able to provide location to a significant degree of precision, such accuracy is unnecessary for many applications and leads to significant additional costs of infrastructure.

There is significant recent artificial intelligence (AI)/machine learning (ML) research on the use of "classification algorithms" for analyzing a set of data items for certain predetermined characteristics, training a database or "data model" to classify data items as having, or not having, those characteristics, and then processing a new data item based on the trained data model to decide whether the new data item has or does not have the identified characteristics. For example, there are known AI/ML systems that process data items consisting of photographs of cats or dogs, and then can, with a high degree of accuracy, classify a new photograph as containing, or not containing, a cat or dog. Such classification algorithms are typically somewhat binary in nature, i.e. they only decide if a data item does or does not have the characteristics, yes or no. The present inventors believe and have determined that such classification algorithms may be useful for radiolocation applications that do not require highly accurate coordinate location determination. For example, the present disclosure relates to determining whether a tracked object is, or is not, within a predefined space, which is believed to be sufficient for many real-world location applications.

Accordingly, there is a need for an asset or object location system that makes highly efficient use of battery power, is deployable in large multi-dimensional environments such as warehouses, hospitals, other multi-story buildings, etc. without requiring significant data communications equipment positioning, installation, and maintenance, or large numbers of reference tags, or the need for high accuracy in coordinate-based location. Furthermore, there is a need for an object location system that does not rely on RF fingerprinting for location determination and is adaptable to environmental changes such as beacon repositioning or failure, interference, or Faraday cage type obstacles.

BRIEF SUMMARY

Briefly and generally described, and according to one aspect, the present disclosure relates to a system and method for location of objects within an identified subspace within a predefined master space. The system and methods involve detecting radio frequency (RF) signals from identifiable RF signal sources within the master space, building one or more computer models of the subspaces based on RF signal characteristics of the RF signals, later receiving RF signals from a transmitting tag associated with an object to be located, accessing the one or more data models of the subspaces, and providing a predicted location of the object as being in a particular identified subspace.

The RF signals employed to construct the computer models may be obtained from preplaced RF beacons, or from other identifiable RF signal sources (IRFSS). The computer models are machine learning (ML) models that can be dynamically updated with additional RF data in response to physical changes in the environment, failure or changes to the RF signal sources, addition of new IRFSS, or other changes. According to one aspect the computer models are created and maintained with a Support Vector Machine (SVM).

The described system(s) and method(s) are useful for locating objects, such as inventory items in a multi-room, multi-story facility such as a warehouse, factories, storage lot, agricultural facility, medical faculties such as hospitals, and the like.

More particularly described, but without limitation except as expressed in the claims, the system and methods provide for location of objects within an identified subspace of a plurality of subspaces defined within a predefined master space. According to an aspect, any type of identifiable RF signal source (IRFSS) whose signal can be operatively detected within the master space may be used in constructing an RF model of the master space. According to one aspect, a plurality of radio frequency (RF) emitting beacons are positioned in a predetermined arrangement such that RF energy from the RF beacons is receivable (i.e. operatively detectable) within the predefined master space and one or more of the subspaces. Each of the RF beacons transmits an RF beacon signal at a predetermined frequency or set of frequencies and has a beacon identifier.

According to a related aspect, existing sources of identifiable RF transmissions such as existing WiFi access points, Bluetooth beacons, nearby cellular base stations, or other RF sources whose signals can be operatively detected within the master space and subspaces may be used in constructing an RF model of the master space. For example, such other types of IRFSS may be identified by characteristics other than a predetermined beacon identifier, such as the frequency of the signal itself, the frequency of a carrier signal e.g. from an AM/FM/broadcast television station, the known characteristics of a cellular/mobile telephone communication tower or antenna, or other metadata (identifying data) that typically accompany RF transmissions from various known sources.

According to an aspect, an RF transmitting and receiving tag is placed into proximate association with an object to be located in the master space. The RF tag includes (i) an electronic tag identifier, (ii) a tag receiver operative to receive RF beacon signals from one or more of the RF beacons as the tag assumes a position within the predefined master space, (iii) a tag data package assembler, and (iv) a tag transmitter operative to transmit a tag data package assembled by the tag data package assembler.

According to an aspect, an object location system includes a radio gateway comprising one or more radio receivers for receiving tag data packages transmitted by the RF transmitting and receiving tags. The system also includes a computer-implemented object location engine coupled to the radio gateway. The object location system is operative for various functions, including:

(a) For a predefined master space in which an object is to be located, in a master space survey operation, assigning a plurality of subspace identifiers to a plurality of subspaces having specific spatial boundaries within the master space and storing the subspace identifiers in a master space database for later association with RF signal data samples taken in a master survey operation.

Receiving data generated by a master space survey operation, represented by RF signal data samples collected within the master space, generating one or more subspace data models from the RF signal data samples for use in connection with an object location operation, and storing the one or more subspace data models in a models database.

For an object location operation to locate an object associated with a particular RF tag associated within a to-be-identified subspace within the master space, receiving RF signals at the tag receiver from one or more of the RF beacons within the to-be-identified subspace within the master space, to thereby obtain a tag-specific RF beacon signal reading data comprising data derived from one or more RF beacon signals and their associated beacon identifiers within the to-be-identified subspace.

At the tag data package assembler associated with the particular RF tag, using the RF beacon signal reading data, generating a tag data package comprising (i) a tag identifier of the particular RF tag, (ii) data associated with the RF beacon signals received from the one or more RF beacons within the to-be-identified subspace, and (iii) the beacon identifiers associated with the RF beacons from which the tag receiver received RF beacon signals.

At the particular RF tag, transmitting the tag data package from the tag data package assembler via the tag transmitter of the RF tag. According to one aspect, the tag data package is compressed prior to transmission.

Receiving a transmitted tag data package from the tag transmitter of the particular RF tag at a gateway radio receiver located so as to receive RF signals containing tag data packages transmitted from one or more RF tags within the to-be-identified subspace within the predefined master space.

Processing a tag data package received by a receiver associated with the radio gateway to extract the RF beacon signals received by the tag receiver in the particular RF tag associated with the object to be located in the to-be-identified subspace, the beacon identifiers, and the tag identifiers associated therewith.

Retrieving one or more stored subspace data models from the models database based on one or more beacon identifiers contained in the tag data package received from the tag associated with the object to be located.

Executing the retrieved one or more stored subspace data models using as input parameters the RF beacon signals extracted from the tag data package received from the tag associated with the object to be located, to identify one or more prediction candidates of subspaces in which the object may be located, each prediction candidate comprising a subspace identifier produced by execution of each of the subspace data models.

Processing the one or more prediction candidates with a selection operation to determine a particular one of the subspace identifiers as the selected subspace identifier in which the object is predicted by the system to be located and thereby generate a determined subspace identifier for the object.

Based on the determined subspace identifier, providing a data output from the object location system as a data package identifying the particular tag and the determined subspace identifier to an external system, as indicating the location of the object associated with the tag.

According to an aspect, the identified subspace is a physical subspace defined by physical boundaries including but not limited to as walls, ceiling, floors, and the like. The identified subspace can also be virtual subspace defined by virtual boundaries within one or more physical rooms.

Advantageously, and according to one aspect, a system and methods as disclosed herein provides for subspace or "room-level" indoor object position location and tracking with high accuracy. Furthermore, such a system and methods minimize the infrastructure cost and deployment, as compared to active location systems.

Advantageously, and according to another aspect, a system and methods as disclosed herein minimizes maintenance cost by adapting to changes in the physical environment by using continuous or active reinforcement of position determination by machine learning (ML) from location data generated by each incident of location of an object.

Advantageously, and according to yet another aspect, a system and methods as disclosed herein facilitate improved object location by using continuous or active reinforcement of position determination by machine learning (ML) from location data generated from one or more stationary or "reference" objects (such as objects with RF tags) or other transmitters whose positions do not change in spite of deliberate or inadvertent changes to the environment from room reconfiguration, Faraday obstacles, equipment failure (e.g. of one or more RF beacons), or other changes that may affect the RF environment. In such other aspect, such reference objects and/or transmitters are used in conjunction with preplaced beacons.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates a simplified exemplary master space comprising multiple zones or "virtual rooms" or subspaces in which an object is to be located in accordance with aspects of this disclosure.

FIG. 2 illustrates the exemplary master space of FIG. 1 in a perspective three-dimensional (3D) view to show multidimensional aspects.

FIG. 3 illustrates the exemplary master space of FIG. 1 to show a scanning or survey operation to obtain RF data samples from beacons deployed in the master space.

FIG. 4 illustrates the exemplary master space of FIG. 1 to show how a stationary object and tag are used according to one aspect to improve or enhance an object location operation.

FIG. 5 illustrates the exemplary master space of FIG. 1 to show an altered RF environment and how such an altered RF environment might affect the location of an object.

FIG. 6 illustrates the exemplary master space of FIG. 1 to show the presence of multiple types of identifiable RF signal sources (IRFSS), including sources not limited to beacons, for use in object location operations.

FIG. 7 is a block diagram of an object location system according to major aspects of the present disclosure.

FIG. 8 illustrates the components of a dual mode RF tag according to one aspect of the present disclosure.

FIG. 9 illustrates the components of an alternative dual mode RF tag according to another aspect of the present disclosure, especially for use in "last ten feet" detection of an object.

FIG. 10 illustrates the architecture of an object location engine and location services of an object location system according to the present disclosure.

FIG. 11, consisting of FIGS. 11A-11C, illustrates exemplary training data of RF signal samples, object location prediction data, and object location data updating and model reinforcement used for training a machine learning (ML) aspect of the present disclosure.

FIG. 12, consisting of FIGS. 12A-12D, illustrates another exemplary survey, training, and model construction data, used for training a machine learning (ML) aspect of the present disclosure.

FIG. 13 is a high-level flow chart of a system and methods for master space modeling and object location prediction according to an aspect of the present disclosure.

FIG. 14 is a flow chart of a computer-implemented master space survey process according an aspect of the present disclosure.

FIG. 15 is a flow chart of further aspects of a computer-implemented survey data preprocessing process according an aspect of the present disclosure.

FIG. 16 is a flow chart of a machine-learning (ML) model training process according an aspect of the present disclosure.

FIG. 17 is a flow chart of a computer-implemented object location process according to an aspect of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for location of objects within pre-defined zones (subspaces or rooms) within a larger master space, using radio frequency (RF) signals transmitted by prepositioned beacons that are received by tags that include RF beacon receivers and a transmitter that communicates with an object location system by transmitting an object location data package containing RF signal data corresponding to the RF beacons whose signals are detectable within the zone (area, room, subspace). These RF signal data are used to invoke a machine-learning (ML) zone prediction of a specific subspace or room within the master space that is likely, within predetermined parameters, to contain the object and its associated tag.

Glossary

Prior to a detailed description of this disclosure, the following glossary of terms and definitions therefor are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Beacon: a device that transmits a RF signal containing identity and other information used in asset tracking, way-finding and proximity marketing; synonymous with RF beacon; RF beacons are placed at various locations within a master space so as to illuminate the master space and its subspaces with detectable RF energy in accordance with this disclosure so as to facilitate object location; a plurality of beacons are utilized in accordance with this disclosure, with each of the plurality of beacons transmitting an RF beacon signal at a predetermined magnitude and frequency and having a unique beacon identifier.

Beacon identifier: a unique data item associated with each of a plurality of RF beacons; a beacon identifier is typically transmitted with the signal from the RF beacon in a prede-termined modulation scheme so that a signal detected from an RF beacon can be distinguished from other RF beacons that may also illuminate the same subspace; a beacon identifier is considered a part of the RF data collected by receiving and processing signals from RF beacons during a sampling, surveying, or object location operation; may be implemented with a MAC address.

BLE: Bluetooth Low Energy, a data communication stan-dard that employs multiple channels in a predetermined frequency band so as to facilitate RF communications pro-tocols such as use of multiple devices in an area of coverage, uplink and downlink communications, frequency hopping, interference avoidance, and other technical features.

Data Model: a set of data items of predetermined types that represent a conceptual entity and are stored in a com-puter database; in accordance with this disclosure, a data model is a set of data items obtained from a surveying operation, a sampling operation, and/or execution of machine learning or similar artificial intelligence algorithms for the purpose of representing a master space, a set of subspaces, and objects that are located within a subspace, whose locations are provided to an external system in accordance with aspects of this disclosure; in particular, an SVM data model.

Dual mode tag: a tag that uses both a RF sensing and a RF communication system for asset location.

Gateway: Synonymous with "radio gateway" or "location receiver"; a device or system or interface that receives transmissions from tags and/or other source of RF signals, and relays the received signals and related information to an application; in accordance with an aspect of this disclosure, certain software-implemented elements of a gateway can be implemented on a remotely-located computing and signal processing platform, e.g. "in the cloud."

Identifiable RF Signal Source (IRFSS): a device that transmits an RF signal of sufficient magnitude and frequency to penetrate a master space and can be detected for use in object location as described in this disclosure; an RF signal from an IRFSS is identifiable in the sense that a system as disclosed herein can distinguish characteristics of the signal, such as frequency, RSSI, identification information trans-mitted with the signal, measured time of flight, directional-ity, and the like, for use in a data model as described herein. A beacon is one form of IRFSS; other types may include external RF sources such as Wi-Fi (IEEE 802.11) signals, cellular network signals, AM/FM/shortwave radio signals, global positioning satellites (GPS), and other types of RF signals which are of sufficient strength and identifiability to be used in connection with object location as described herein.

Location engine: synonymous with object location engine; a component of the disclosed object location system whose function is to run machine learning models in an object location operation.

Machine learning (ML): a computer-implemented data processing operation that processes data from a training database so as permit subsequent data processing operation to render a computational result that reflects predetermined and "learned" characteristics of the data forming the training database and improves the computational result with repeated iterations of the computations using additional sets of data; machine learning is a broad field of computer science that includes many different algorithms for processing the training database and arriving at computational results that reflect such learning; machine learning is generally considered a form or species of "artificial intelligence", which is a broader type of data processing operation that is considered to emulate aspects of human intelligence; a support vector machine (SVM) is considered a species of machine learning.

Master space: a predefined region or area, preferably multi-dimensional such as three-dimensional (3D) in which an object is to be located; the master space is subdivided into smaller, predefined units or "subspaces" in accordance with aspects of this disclosure.

Master space survey operation: a process or operation, whether automated or manual, for exploring, physically or virtually, a master space so as to determine its spatial boundaries and determine a logical arrangement of rooms or subspaces, within which objects are to be located; a master space survey operation results in assignment of subspace identifiers; a master space survey operation may be conducted manually by workers (people) with measuring equipment for defining actual and/or virtual boundaries, or in an automated manner by mobile equipment such as drones, robots, etc. that inspect the master space, determine boundaries, and assign subspace identifiers based on characteristics within the master space such as doors, stairs, walls, windows, shelves, cabinets, or other types of physical barriers or delimiting features within the master space.

Master space database: a computer-implemented database for storing, processing, and retrieving data items associated with the master space including but not limited to a master space identifier or name, subspace identifiers, features about the master space and/or subspace, the values of RF signals detected within the master space and/or its subspaces, and any other data items deemed useful in locating objects within the master space.

Object: anything (thing, person, or other physical entity) whose location within a master space is to be identified and provided for some useful purpose, e.g. locating a package object with a warehouse, locating a fire engine object within a few city blocks, locating a person within a building, etc.; an object must be able to carry an RF tag within a master space in accordance with this disclosure in order to be located.

Object location operation: a process of the object location system for locating an object within a master space by determining a prediction candidate comprising predicted location of an object associated with an RF tag as disclosed herein, typically by executing one or more machine learning data models on a received tag data package.

Object location system (OLS): a computer-implemented system that includes one or more databases, in particular a sampling database, a master space database, one or more data models; one or more RF receivers configured to receive signals transmitted by RF tags; user interface to allow operators to configure and operate the system; an output that provides information about an object to be located and its characteristics; such an object location system is constructed in accordance with aspects of this disclosure; synonymous with object locator system.

Object location data package: a collection of information relating to a particular object located in accordance with aspects of this disclosure, typically comprising an object identifier, an RF tag identifier, a subspace or room identifier, and other possibly relevant information such as a time stamp, one or more beacon identifiers that were involved in locating the object.

Prediction candidate: a set of one or more potential subspaces within which an object to be located may actually be located; prediction candidates are typically represented by subspace identifiers in accordance with some aspects of this disclosure.

RF tag: an electronic device that transmits and receives RF signals for the purpose of locating an object to which the tag is affixed in some form or fashion; an RF tag typically possesses a power source, an RF tag transmitter for transmitting a tag data package, and RF tag receiver operative for detecting and receiving RF beacon signals from one or more RF beacons, and an electronic tag identifier that is provided as a part of a tag data package.

Room: generally synonymous with "subspace" (or zone, area); a room may be a predefined area or region within the master space having spatial boundaries; a room need not have actual physical boundaries; a room or subspace may have actual physical boundaries, virtual boundaries, or a combination of actual physical and virtual boundaries.

RSSI: "Received Signal Strength Indicator"—a measurement of the power of an RF signal into a receiver; may be reported in dBm or arbitrary units.

RTLS: "Real-Time Location Service"—denotes a system and/or service for location of object on a real-time basis, often indoors; real-time typically means virtually instantaneously, within a predetermined response time suitable for an application in which a user is desiring to make use of the location for some immediate purpose, e.g. to communicate with the object, retrieve the object, update a database of information relating to the object or its use, etc.

Sampling database: a computer-implemented database for storing, process, and retrieving data items associated with a sampling operation, thereby generating a map of a master space and the specific values of data items obtained during a sampling operation including beacon identifiers, subspace identifiers, RF frequencies detected, signal strengths, etc.

Sampling operation: a process or operation, whether automated or manual, wherein one or more RF beacon signals and their accompanying RF data are detected by receivers so as to obtain a set of RF data samples at a particular subspace; a survey is conducted with a sampling operation.

Scan: a process of receiving RSSI and identifying data from RF sources like beacons; typically involves use of an RF receiving device that is transported throughout a master space collecting RSSI samples and/or frequency data and storing them in a sampling database for use in constructing a data model; a scan may also be considered an instance of data comprising a set of data samples, e.g. a set of RSSI values collected at a point in time; as context herein may suggest, the term "scan" may also reference the data received from an RF tag (tag data package) in connection with an object location operation.

SVM: "Support Vector Machine"; in machine learning, support-vector machines are supervised learning models with associated learning algorithms that analyze data used for classification and regression analysis; SVM is considered a species of artificial intelligence (AI); SVM is particularly useful for addressing data classification problems, e.g. by classifying a data item into a set based on characteristics of the data, especially as compared with a training data set of similar data.

Survey: generally synonymous with Scan, above; a sampling operation conducted for constructing a data model; in particular a sampling operation involving collecting a set of scans (data samples) from a plurality of RF beacons, within predefined subspaces or rooms within a master space; typically conducted for purposes of establishing and training a data model, e.g. an SVM data model.

Subspace: generally synonymous with "room" (or area or zone); a subspace may be a predefined area or region within the master space having spatial boundaries; a subspace need not have actual physical boundaries; a room or subspace may have actual physical boundaries, virtual boundaries, or a combination of actual physical and virtual boundaries.

Subspace identifier: a data item associated with a predefined subspace; a subspace identifier is used to uniquely identify a particular subspace and differentiate it from other subspaces within the master space.

Tag: a device attached to an object or other asset that is used to determine its location; generally synonymous with RF tag.

Tag data package: a collection of data collected by an RF tag comprising one or more data items such as (i) a tag identifier of the particular RF tag, (ii) data (e.g. RSSI data, frequency data) associated with the RF beacon signals received from one or more RF beacons within a subspace that is to be identified, and/or (iii) the beacon identifiers associated with the RF beacons from which the tag receiver received RF beacon signals; may also include other identifying information from other identifiable RF signal sources (IRF SS), e.g. frequency, accompanying metadata, RSSI, etc.

Virtual Room (VR): a subspace that does not have actual physical boundaries, but has boundaries of a predetermined dimensions that may no coincide with any physical boundaries such as walls, floors, ceilings, etc.; a virtual room can encompass a space within a larger space or subspace, or may also encompass a space that subsumes or encapsulates one or more actual physical spaces.

Zone: synonymous with area, room, and subspace.

Object Location System—Environment Overview

FIG. 1 illustrates aspects of deployment of an object location system 10 and associated methods, constructed and operated as described in this disclosure, for purposes of locating one or more exemplary objects 20 (e.g. 20a, 20b) that are each associated with an RF tag 25 (e.g. 25a, 25b), according to one initial aspect. FIG. 1 shows an exemplary spatial environment such as a multi-story building 30 that is considered a "master space." The building or master space 30 is typically three-dimensional (3D) and comprises a plurality of subspaces or rooms identified as Room A, Room B, Room C, and Room D. It will of course be appreciated that the number of rooms or subspaces is arbitrary and can vary. The subspaces or rooms can be actual physical rooms defined by physical barriers such as floors, walls, ceiling, or can be virtual rooms with virtual boundaries. A virtual room can encompass more than one physical room or can define a smaller subspace within a physical room. For example, Room A in FIG. 1 is a virtual room that extends across two physical rooms, Room 1 (R1) and Room 2 (R2), which are separated by a wall (W). Room C is a virtual room within Room 2 and shares the physical space with Room A. Room B on the other hand is solely contained within physical Room 3 (R3), as is Room D is physically the same as Room 4 (R4).

In accordance with one aspect of this disclosure, the master space 30 is preconfigured with installation of a plurality of RF beacons identified as B1-B5, for example, dispersed throughout the master space so as to irradiate the space and contained subspaces or rooms with RF energy from the beacons. The RF beacons are constructed as described elsewhere herein. The RF beacons are preferably distributed so that each position within the master space receives at least one signal from at least one beacon, and preferably such that each position receives signals from multiple beacons.

In accordance with a preferred aspect, the beacons B employed in disclosed embodiments are Bluetooth Low Energy (BLE) radio beacons that are prepositioned within the master space at predetermined strategic locations, for purposes of transmitting BLE signals from a plurality of beacons into each room or subspace of the master space. One example of a beacon that may be used in accordance with aspects of this disclosure is the il0 Indoor Beacon manufactured by Shenzhen Minew Technologies Co. Ltd., Shenzhen, China, a/k/a Minew Tech, details of which are available from the manufacturer. Other similar devices may also be used.

It is preferred that a plurality of beacons will be disposed throughout the master space, spaced apart such that each room or subspace will be irradiated/illuminated by RF energy of sufficient magnitude such that an RF tag, as described herein, will receive RF beacon signals from at least one beacon, and preferably from a plurality of beacons, and preferably at least two beacons. Signals from more than about 4-6 beacons may impact the performance and response time of a location operation, although some applications may require or prefer a larger number of beacons.

According to one aspect, the beacons B transmit their beacon signals on a predetermined basis, established by the system operator. The beacons may be configured to transmit on a regular basis, such as periodically or on a predetermined timing schedule, or to transmit on demand. In such a system, the beacons could be configured to transmit "on demand", for example, only during a survey operation, or during an object location operation. An "on demand" configuration requires some type of communication and command structure at the beacon, so that the beacon could receive a signal from the system 10 containing a command to transmit. A timing schedule requires a time synchronization function at the beacon, so that tags can be in a receive mode at the time that the beacons are transmitting.

Although a set of preplaced beacons B are a preferred configuration for a system 10, it will be understood that the system may also operate in conjunction with other identifiable RS signal sources (IRFSS). Considerations of using other IRFSS to provide RF samples include the availability of preexisting radio sources, the strength/magnitude of signals from such sources as seen within the master space, the ability of the tags to receive signals from other IRFSS, identifying information or characteristics of the other IRFSS signals that allow use in constructing data models, the stability of such other IRFSS as to movement and signal characteristics, the presence of obstructions to or interference for signals from the IRFSS, and the like. Suitable candidates for other IRFSS include Wi-Fi access points, AM/FM/shortwave/television transmitters in the vicinity of the master space, air navigation beacons, cellular network towers, etc. Other types of RF sources may occur to those skilled in the art.

In FIG. 1, note that tag 25a associated with object 20a, in virtual Room A, receives signals from four exemplary beacons: B1, B2 on the same floor of the master space 30, and also from B3, B4 on an adjacent but upper floor. Similarly, tag 25b on object 20b in Room D receives signals from beacons B2, B4, B5. In accordance with aspects of this disclosure, each tag 25a, 25b communicates with the object location system 10 by transmitting a tag data package, as described elsewhere herein, via a separate RF communication channel, also as described elsewhere, on a predetermined communication basis and protocol. The disclosed object location system then determines the location of the objects 20 within the master space 30, typically by identifying a particular room or subspace that has been determined as containing the object. The object location system typically then provides an object location data package, as described elsewhere herein, via a data communications network 40, e.g. the Internet, to customer applications 50. Customer applications may vary widely, as determined by a user of the system 10 that desires to locate and/or track the movement of objects 20 within the master space.

Also shown in FIG. 1 are a number of sample points identified as Si, S2, S3 . . . Sn. In accordance with an aspect of this disclosure, objects are located by use of and reference to a data model of the RF environment of the master space 30 developed by taking RF signal samples at sample locations S, as described elsewhere herein. The data model of the space is constructed by a survey process involving the collection of RF data samples at various locations within various subspaces within the master space, e.g. samples S1, S2 . . . Sn, typically with RSSI data. Those samples are stored in a sampling database, described elsewhere, and associated with specific identified subspaces. The collection of data samples and associated identified subspaces are processed with a machine learning (ML) algorithm so as to generate a data model that provides the basis for a later determination of an object location. As more fully described elsewhere, a tag data package from an RF tag associated with a particular object to be located is processed by reference to the data model, to generate a prediction candidate of a specific subspace or room in which the tag, and hence the associated object, is most likely to be located. Aspects of the data model, survey operation, etc. are described in more detail below.

FIG. 2 illustrates the exemplary master space 30 in a three-dimensional (3D) view, so as to illustrate the multi-room, multi-dimensional aspects of object location, as compared to the more two-dimensional (flat) view in FIG. 1. FIG. 2 shows the object 20 and associated RF tag 25, located within Room A. The RF tag 25 receives BLE signals from multiple RF beacons, e.g. B1, B2, B3, B4, as in FIG. 1. This view illustrates that the beacons B are typically dispersed throughout the master space and need not be in the same room or subspaces as any particular object to be located. Likewise, the beacons may be dispersed on different levels within the master space, provided that, preferably, any location within a subspace in which an object is to be located receives signals from at least one beacon and preferably multiple beacons.

Accordingly, and preferably, the signals from the beacons employed in aspects of this disclosure are of sufficient magnitude to cover multiple rooms or subspaces. This contrasts with approaches that use low power or passive RFID tags, which typically have a very limited range. Also as shown in FIG. 1, the master space 30 has been sampled by a prior sampling operation or process, as described elsewhere, so that a data model of the 3D space is constructed and utilized for object location, by reference to multiple RSSI samples Si, S2 . . . Sn of the RF environment of the master space and its associated subspaces or rooms.

FIG. 3 illustrates a survey process or operation for purposes of collecting RSSI data samples at various sampling locations Si, S2 . . . Sn throughout the master space 30 and its associated subspaces e.g. Room A, Room B, Room C, Room D, in accordance with aspects of this disclosure. The survey process is typically conducted by a person or a mobile machine (e.g. a robot, drone, or other autonomous mobile machine) that carries an RF scanning or room survey device 60. The survey device 60 comprises a BLE signal receiver (not shown) that receives beacon signals from a number of RF beacons, e.g. from B1, B2, B4, etc., allows entry of data identifying a physical or virtual subspace or room, e.g. Room B in the example of FIG. 3, and transmits a set of RF signal samples, beacon identifiers, and information used for subspace identification, via a radio transmitter associated with the survey device 60, to the object location system. This data is then used for model construction and maintenance. According to another aspect, a survey tool comprising a plurality of RF tags as described herein may be deployed within the master space and subspaces as the survey device 60; data obtained from the plurality of RF tags may be used as the survey data.

It will be appreciated that the survey device 60 may also include other RF receivers for purposes of using RF signals from other identifiable RF signal sources (IRF SS), which can also be used in model construction. For example, and as shown elsewhere, RF signals from IEEE 802.11 (Wi-Fi), cellular networks, GPS satellites, AM/FM/shortwave, television, or other known, and typically locationally and carrier-signal stable RF sources, can be used in alternative embodiments. To use such other IRFSS signals, the survey device will require a compatible receiver and associated components and/or software for determining appropriate RF signal characteristics (RSSI) and associating it with identification information about the IRFSS.

It will be appreciated that a survey operation typically involves taking RSSI samples at various locations, e.g. Si, S2 . . . Sn within a particular subspace, so as to "visit" and obtain RSSI samples within a variety of different locations, elevations, rooms, near and away from obstacles, etc., so as to create a thorough map of the RF environment illuminated by the plurality of beacons B or other IRFSS. It will also be appreciated that one or more surveys may be conducted to construct a data model, and subsequent surveys may be conducted to update or maintain the data model to compensate for changes in the environment that may result from things such as addition or removal of walls, doors, windows, shelving, roofs, RF shielding/Faraday barriers, stacks of objects, furniture, and any number of things that might affect the transmissibility and reception of RF signals from the beacons or other IRFSS by RF tags associated with objects.

FIG. 4 illustrates a master space 30 and use of a stationary object 20b with associated tag 25b for purposes of data model stabilization or calibration, in accordance with one aspect of the present disclosure. FIG. 4 also illustrates aspects of movement of an object 20a in Room A to a second position in Room C at 20a' for purposes of object tracking within the master space, in a particular application.

In accordance with one aspect, the master space may be provided with one or more stationary or "reference" objects and/or tags, positioned at various locations within the master space, within one or more subspaces, actual or virtual. For example, consider that the object 20*b* and its associated RF tag 25*b*, are positioned within Room D, in a position where it cannot be readily moved. For example, the object and/or tag could be fastened to a wall or floor, or placed in a position that is not readily accessible such as in a special space. The stationary RF tag 25*b* need not even be associated with an object, but could represent a "virtual" object, as the primary purpose of a stationary object or tag is to provide object data packages identifying the stationary object and/or tag at various times. This allows the system to monitor for changes in the RF environment that might result from changes to the physical space or placement of objects or Faraday cage type objects within the space that could affect the reception of beacon signals by objects that are to be located.

It should be understood that it is not necessary to use stationary objects and/or stationary tags in order to monitor for changes in the RF environment that might result from changes to the physical space or placement of objects or Faraday cage type objects or barriers within the space that could affect the reception of beacon signals by objects that are to be located. In accordance with one preferred aspect of operation, RF tags 25 as described herein transmit data representing the beacon signals received by such tags on a predetermined basis (e.g. periodically, on demand, etc.) to the object location system 10 for use in constructing and training data models for object location. Data scans collected from any tags within the master space, whether moving, stationary, or temporarily stationary, provide a corresponding flow of RS SI values that can be used to construct additional data models as described herein and/or update existing models for use in locating objects.

According to one aspect, a stationary object 20*b* (physical or virtual) and associated stationary tag 25*b* may transmit tag data packages at certain predetermined intervals or times to the object location system 10. For example, the stationary object data packages may be transmitted at predetermined intervals, e.g. each hour, day, week, etc., or alternatively at particular times on a predetermined schedule, or if the tag is configured to receive a prompt or trigger signal, upon command from the object location system 10 or from a beacon B. For example, one or more beacons could be configured to transmit a prompt signal on some predetermined basis to one or more tags, and the tags configured to respond on a predetermined basis to transmit a data package, independently of a location operation is in process.

According to another aspect, FIG. 4 also shows the optional use of an auxiliary object location system (OLS) receiver or gateway 65, which may be deployed for purposes of collecting tag data packages at various other locations within the master space 30. According to this alternative and optional aspect, it will be appreciated that one or more auxiliary OLS receivers 65 may be deployed within the master space (only one is shown in FIG. 4) so as to provide for redundancy in receiving signals from RF tags 25, in case of failure of a receiver at the OLS system 10 or signal reception complications that might result from reconfiguration of the master space or its subspaces, or placement of obstacles such as Faraday barrier type obstacles that might affect transmission of signals from the tags to the object location system 10.

In accordance with one aspect of the present disclosure, a tag 25*b* associated with a stationary object 20*b* should in most instances receive constant and/or consistent beacon signals from the various beacons which are proximate enough to the stationary object to be reliably received. In the event that the system detects changes in the RSSI of beacon signals received from a stationary tag such as 25*b*, the system can take action in compensation. For example, the system can generate an alert to changes in the RF environment. As another example, and preferably, the system can update a data model of the master space in the event of determination that a permanent or persistent change to the RF environment has occurred. This can obviate a further survey of the master space to adjust for environmental changes, beacon failures, etc., or at least allow temporary adjustment in a data model until such time as a re-survey may be desirable.

Still referring to FIG. 4, another aspect of the present disclosure involves the tracking of movement of an object, e.g. object 20*a* and its associated RF tag 25*a*, from one location to another within the master space. As shown in this figure, assume that the object 20*a* and tag 25*a* move within Room A (which is virtual in the example discussed) to another physical room on the other side of wall W, but still within Room A, to assume position 20*a'*, 25*a'*. In accordance with an aspect of this disclosure, movement of an object might trigger a transmission of a tag data package that contains a data item indicating object movement. For example, the preferred RF tag 25, as shown in FIG. 8, includes a motion sensor that detects a predetermined degree of movement of an object. This motion sensor can be used to trigger transmission of a tag data package from the tag so that the object location system 10 can indicate object movement. Such object movement may be for purposes of following or tracking an object, warning of theft or tampering or handling of an object, etc. According to another aspect, if the object location system is associated with an object location database (not shown), or a customer maintains such an object location database, for the purpose of associating a present location of an object with a particular location, a movement indication could be used to update the database automatically. Such an object location database could be maintained by or in association with the disclosed object location system 10, or maintained by a customer who receives object location information from the disclosed object location system for its own private purposes.

FIG. 5 illustrates how a change in the RF environment of the master space 30 may be detected and adjusted for, in accordance with an aspect of this disclosure. FIG. 5 differs from FIG. 1 in that the master space 30 shows the object 20*a* and its associated RF tag 25 is in the same position in Room A as in FIG. 1, but is partially shielded by a Faraday cage or barrier type object, e.g. an additional wall W2 made of metal. Those skilled in the art will understand and appreciate that metal constructions such as walls, screens, boxes, shelving, etc. affect the transmissibility of radio signals of certain frequencies, amplitudes, and modulation schemes. In some instances, the addition or movement of such Faraday cage type object can affect the reception of beacon signals by RF tags, and/or RF signals from IRFSS, whether or not the objects have been moved or handled.

As seen in FIG. 5, compared to FIG. 1, the RF beacon signals from beacons B1 and B3 are obstructed by the metal wall W2, which reduces the signal strength from these two beacons as they are received at the RF tag 25*a* associated with object 20*a*. In some cases, a metal wall or other Faraday cage type object may actual completely block signals at certain frequencies and amplitudes, thereby removing signals from some sources from use in object location, at least until adjustments can be made to a data model.

In accordance with one aspect, the disclosed object location system 10 adjusts to the addition of this and other RF-signal-affecting obstacles or barriers in several different ways. According to one aspect, the addition of the metal wall W2 could be detected automatically, especially in cases where one or more stationary objects such as shown in FIG. 4 are utilized, and the altered RF signals from the stationary object are discovered or detected as having changed from a previous transmission from the RF tag associated with the stationary object. The changed RSSI data values from a transmission occurring subsequent to the addition of the wall is added to the data model. In subsequent object location operations, the updated data model will then reflect the changed RF environment and the object can still be reliably located.

According to another aspect, the operator of the object location system 10 is notified of the addition of the obstruction of wall W2, and can re-survey the area affected, e.g. Rooms A and B can be re-surveyed and the data model updated. According to yet another aspect, assume that the object 20 and its associated RF tag 25 has previously communicated its location to the object location system, in a prior location operation. The fact of addition of the metal wall W2, or at least the occurrence of some change to the RF environment, is automatically detected by comparing the RSSI signals from a first object location operation (or other tag signal communication) to the signals from a second or subsequent object location operation (or other tag signal communication), and either automatically updating the data model or generating an alert to a system operator of a change in the RF environment that may require a re-survey operation or other remedial action.

According to yet another aspect, and also as shown in FIG. 5, in a similar manner a change in the RF environment may occur in the event of failure or faulty operation of a beacon. For example, note in FIG. 5 that beacon B2 in Room C has failed, such that it is not transmitting its RF beacon signal. In this example, object 20b and its associated RF tag 25b no longer receives beacon signals from beacon B2, but still receives beacon signals from beacons B4 and B5. Likewise, object 20a and its associated RF tag 25a no longer receives beacon signals from beacon B2, but still receives beacon signals from beacons B1, B3, and B4. In a manner similar to that described above, the disclosed system adjusts for the loss of signal from beacon B2 in various ways as described above, e.g. updating the data model, alerting of the failure of the beacon B2, etc. The detection of the altered RF environment takes place automatically or in response to an alert of the change and possible repair or replacement of the failed beacon B2.

In accordance with the above-described aspects of diminished signals from beacons or other IRFSS, or failed beacons, a process of updating and/or reinforcement of a data model can be executed, so that a change in the RF environment of a master space can be dynamically updated for subsequent object location operations. By way of example and not limitation, see the discussion below associated with FIG. 13 as regards data obtained by additional or reinforcement scans.

Object Location System

Turn now to FIG. 7 for a detailed description of the disclosed object location system 10, constructed and operated in accordance with aspects of this disclosure. The disclosed object location system (OLS) 10 comprises four major components: an object location engine 700, a location data gateway 710, location services 720, and customer services 770. Details of these major components are described in more detail below.

According to one aspect, the location data gateway 710 comprises a UHF radio gateway 712 for communicating with the disclosed tag 25, as well as other location data gateways 715 for receiving location information from other sources such as other identifiable RF signal sources (IRFSS). Although the RF signals from beacons and from other IRFSS may be different frequencies, bands, magnitudes, RSSI, etc., it will be appreciated that the principles of usage of such signals and their associated identifying data is the same. Thus, the remarks which follow as to operations of a UHF radio gateway 712 apply also to other location data sources 715.

The UHF radio gateway 712 may be constructed using a RadioCloud® UHF radio gateway manufactured by Cognosos, Inc., Atlanta, GA. Details of this UHF radio gateway are available in the literature supplied by the manufacturer.

The UHF radio gateway 712 is configured and operative to receive UHF radio signals transmitted from time to time, or upon demand, from one or more RF tags 25a, 25b, . . . 25n associated with one or more objects 20a, 20b, 20n to be located within a particular subspace or room within a master space 30, as shown in prior drawing figures. As discussed previously and elsewhere herein, each of the plurality of RF tags 25 is operative to receive RF beacon signals from one or more RF beacons B1, B2 . . . Bn. Alternatively, or in addition, the RF tags may be configured to receive other RF signals from other IRFSS transmitters. In accordance with one aspect, the UHF radio signals from the tags contain tag data packages from tags associated with object, as described herein. In accordance with another aspect, the radio signals from other IRFSS transmitters are associated with identifying information such as frequency, initial RSSI, directionality, or information or content associated with the signal to allow its identification.

The UHF radio gateway 712 may be positioned within the master space, or alternatively may be configured to connect with remote or "gateway" receivers positioned within or near the master space, and communicate the data packages from the receiver(s) in the radio gateway for demodulation and data package disassembly.

According to one aspect, the preferred UHF radio gateway 712 is operative for receiving one or more transmitted tag data packages, transmitted in a predetermined modulation scheme, from the tag transmitters of one or more RF tags 25 at one or more gateway receivers (not separately shown) within operative proximity to the master space, so as to receive RF signals containing tag data packages transmitted from one or more RF tags within the to-be-identified subspace within the predefined master space. Preferably, the received tag data packages are demodulated by the gateway receivers, either stand-alone receivers or receivers associated with the UHF radio gateway 712, and disassembled into the discrete data items forming the data packages. Typically, a tag data package includes data items corresponding to (i) a tag identifier that identifies a particular RF tag, (ii) data representing the RSSI values of all RF beacons whose signals were received by the RF tag, (iii) beacon identifier data items representing the identification of the beacons whose signals were received by a tag, associated with the RSSI values of the signals from each distinct beacon.

Alternatively, or in addition, the frequency of the signal received from a beacon may be used as a data item included in the tag data package.

As a further alternative, or in addition, data associated with a signal received from one or more IRFSS transmitters may be included as a part of a tag data package, or may form an independent tag data package independent of a tag data package from a beacon. For example, an independent tag data package may include, for an IRFSS transmitter signal of a given source, (i) the frequency of the signal, (ii) the RSSI value of the signal, (iii) content transmitted by the IRFSS transmitter that assists in identification of the signal source, (iv) phase, timing, or directionality information derived from the IRFSS relative to receipt of the same signal by other receivers in the system. Any or all of such additional information may be used in aspects of the disclosed system to form data in the data model, and used for location of objects that can receive such beacon and/or other IRFSS signals.

The object location system 10 further comprises an object location engine 700 whose principal function is to generate and maintain one or more data models used in machine learning (ML) of the RF characteristics, among other things, of the master space, allow assignment of subspaces within the master space, and access the ML data models in locating objects.

Primarily, and generally speaking, the object location engine 700 is the computer-implemented component that processes tag data packages received by gateway receiver(s) to extract the RF beacon signals received by the tag receivers in the plurality of RF tags associated with objects to be located in the to-be-identified subspaces, the beacon identifiers, and the tag identifiers associated therewith, so as to provide a specifically identified subspace or room (i.e. a location) for a specific RF tag and its associated object within the master space.

The object location engine 700 comprises several major software-implemented components, for example, an application programming interface (API) gateway for connection to the location data gateway 710, a location integration module or service, a packet pre-processing module or service, a rules engine, a model training model or service, a model lookup and prediction module or service, and database storage module or services. Details of these primary components are described in greater detail in connection with other figures. The API gateway for the UHF radio gateway receives signals from the various RF tags during their operation, as well as signals from a surveying device as described above.

Still referring to FIG. 7, the object location engine 700 provides location information to location services 720, primarily in the form of object identifier data, location data, and other associated data such as a timestamp, security information, customer identification information, and any other information that may be useful by customers in connection with object location. Location services 720 are computer-implemented and may reside within and implemented by the object location system 10, or customers may construct their own location applications locally with use of the location data provided by the system 10. Location services 720 can include an API so that a customer (not shown) can communicate via the network 40 with the object location system 10, to provide data such as object identifiers for use by the system 10 in its location operations, on-demand signals to trigger an RF tag to illuminate an LED or other indicator, or provide an audible sound, to assist in "last ten feet" location or object presence verification.

In addition, the location services 720 provides an abstraction layer over the object location engine 700, such that customer services 770 is decoupled from the specific implementation. For instance, the object location engine 700 can be further modified, replaced, or augmented by other systems and techniques comprising location services 720, for providing alternative, confirming, or supplementary location information for the master space, associated subspaces, and/or objects to be located. Thus, as shown in FIG. 7, location services can be provided to the network 40 for use by customer applications 780 independently of the customer services functions 770.

Those skilled in the art will understand and appreciate the wide variety of customer applications that can be constructed using the object location information provided in various aspects of this disclosure.

Typically, a customer or user of the system 10 will communicate with the system to conduct object location operations via computer-implemented customer services 770. The customer services 770 comprises a number of communication functions accessed via an application programming interface (API) that allows customers or users to provide its information to the system 10, and receive outputs indicating object location. Details of customer services are discretionary with users of the system, and will not be further described herein, as aspects of such services will be apparent to those skilled in the art.

Also shown in FIG. 7 are several primary databases used by the disclosed object location system 10 to implement its functions. For example, a survey database 730 is used to store data obtained during a survey operation, such as RSSI data provided by a survey device 60 (FIG. 3) in association with a subspace or room identifier. Data in the survey database is used to construct a data model showing expected RSSI values at various locations within the master space, within particular identified subspaces.

Another database is a training database 740. This database stores data derived from the survey database in a format that is used to train a machine learning data model to represent the master space and its subspaces. The training database 740 is preferably constructed initially with the survey data, but once a data model is constructed using specific RSSI data values associated with their respective identified room, the training data is preferably held static (i.e. not changed) until a decision is made to update or maintain the data used for model construction and training.

Alternatively, or in addition, the training database 740 and the survey databases 730 can be the same database. It will be understood that one purpose of a maintaining a training database separately from a survey database is to preserve historical information as to a particular layout of a space. Once a model has been created and used for object location operations, and in the event of an embodiment wherein the data values from survey and object location operations are updated, the model is then dynamically updated as operations or changes to the environment occur. According to one aspect, there is no need to maintain a separate survey database and training database.

Yet another database is a model storage database 750. The model storage database stores data representing one or more data models which are used for object location candidate prediction, as described elsewhere. In accordance with an aspect of this disclosure, object location is effected by receiving RSSI data values in a tag data package received from a particular RF tag associated with a particular object, and running the data model to obtain a prediction candidate that represents at least a threshold likelihood that the particular RF tag and associated object are in a particular identified room. Data models stored in the model storage database may be updated and/or maintained based on new data received from a subsequent survey, operations for object location, and indications of changes to the RF environment which might affect the beacon signals.

FIG. 7 also shows a customer database 760 maintained in connection with the object location system 10. Typically, the customer database 760 stores customer-specific information such as customer identification, object identifiers for objects associated with a particular customer that are to be located or have already been located in prior operations of the object location system 10. The customer services component or module 770 accesses the customer data database 760 so as to receive customer information such as object identifiers. According to one aspect, the customer database 760 stores object identifiers associated with particular customers or users, in association with location information determined by object location operations as described herein. Customers or users typically will access the object location information remotely by use of their own customer applications 780 (not described herein), via the network 40, invoking functions of the customer services module or component 770. Details of such remote data access functions are within the ordinary capabilities of those skilled in the art.

Details of RF Tag

FIG. 8 illustrates details of the components of an exemplary specific device used to implement an RF tag 25 in accordance with aspects of the present disclosure. As will be understood, an RF tag 25 is affixed or otherwise associated with a specific object 20 (not shown) which is to be located in accordance with this disclosure. The RF tag 25 receives Bluetooth Low Energy (BLE) signals from one or more beacons B1, B2 Bn, generates a tag data package (not shown), and transmits this tag data package via a UHF transmitter to the object location system 10. In addition, or alternatively, the RF tag receives other RF signals from other identifiable RF signal sources (IRFSS).

The preferred tag 25 is considered "dual mode" in that it contains a BLE receiver 810 for receiving BLE signals from beacons, as well as a UHF transmitter 820 for communicating with the object location system 10.

In addition, or alternatively, an RF tag 25 may be configured to receive RF signals from other, non-beacon identifiable RF signal sources (IRFSS) and generate a tag data package containing information associated with such other signal sources, in particular RSSI data, frequency data, and identifying data. In such a configuration, the BLE receiver 810 will be a receiver configured to receive signals other than beacon signals, or in addition thereto.

The disclosed tag 25 further comprises and is controlled by a microprocessor 830, which is coupled for data communication with the BLE receiver 810 and UHF transmitter 820. The microprocessor is operative, as described in various places herein, for receiving signals from the beacon, in BLE format in the disclosed embodiment, extracting the RSSI data from each signal received from a beacon, and associating the RSSI values from one or more beacons with an object identifier, to generate a tag data package. Typically, an object identifier is input into the microprocessor and stored therein upon association of the tag with a particular object.

Alternatively, a tag may be preconfigured to include object identifier information for an object associated with the tag, which is then stored in the on-board memory of the microprocessor and transmitted with the tag data package in association with other data. As a specific example, a stationary tag such as shown in FIG. 4 may be preconfigured to include identifying information that the tag is stationary, for ready identification and usage for calibration, location accuracy refinement, etc.

The disclosed tag 25 preferably further includes a motion sensor 840, which detects movement of the tag and/or its associated object, for example, if an object is tampered with, moved, and/or the tag is removed. The motion sensor 840 is preferably a solid-state accelerometer that provides a "wake up" or interrupt signal to the microprocessor 830 upon detection of motion greater than a preconfigured amount, thereby indicating motion (acceleration) of a nature to indicate a motion that may indicate tampering, movement, tag removal, etc. The motion sensor 840 is preferably self-powered (e.g. with a capacitive stored charge) so that the microprocessor can assume an idle (sleeping) state for long periods of time without significant battery drain, but sufficient to "wake" the microprocessor in the event the motion sensor is actuated by a movement of preconfigured threshold.

The disclosed tag 25 also may include data inputs coupled to the microprocessor 830 for optional external sensors or switches for various other purposes that may be desired by a customer. For example, and not shown, other devise or sensors may include and employ (a) a temperature sensing device or thermometer may be included and employed for temperature monitoring of an object, (b) a light sensors for detecting whether an object (such as a living plant or light-sensitive object) is illuminated, (c) a sound sensor or microphone for detecting whether an object is being subject to sound waves above a predetermined threshold or having particular aural properties that might indicate something such as opening of a package or a door or dropping of the object (perhaps coupled with a high G-force signal from the motion sensor) that may suggest damage to an object, (d) a pressure sensor for detecting atmospheric pressure of the environment of any object, (e) a pressure or touch sensor for detecting contact with or upon an object that may indicate tampering or other physical interference, (f) a tampering detector for detecting that an object has been touched, manipulated, opened, damaged, or otherwise interfered with, and/or (g) a data input (such as for a USB keyboard) for configuration such as inputting of object identification and/or customer identification data. Other types of sensors or inputs for other purpose will occur to those skilled in the art, for purposes independent of object location but in certain instances in cooperation with location determination.

The disclosed embodiment preferably employs a Cognosos model RT-300 RTLS Tag as the RF tag 25 in all applications. The Cognosos model RT-300 RTLS tags 25 are available from Cognosos, Inc., 1100 Spring Street NW, Suite 300A, Atlanta, GA 30309. Details of the preferred tag are available in the literature provided by the manufacturer.

The RT-300 RF tag is a battery powered device that integrates a motion sensor 840 that senses when an associated asset (object) is moved and transmits its location to the UHF radio gateway 712 (FIG. 7). Preferably, each tag 25 is configured to transmit a unique tag identifier (ID) and location information only when an asset has ceased movement to conserve battery power. By using the disclosed and preferred RF tag, transmissions require very little power but can be accurately received up to hundreds of feet away by the radio gateway 712. The disclosed radio gateway 712 can cover up to 100,000 square feet indoors.

For association and attachment to an object to be located or tracked, the disclosed RF tag 25 is provided with an easy to install cradle (not shown) that can be attached to most flat plastic or metal surfaces with double-sided tape or cable ties. Each RF tag 25 is provided with an internal coin lithium (Li—MnO2) CR2450 cell battery that can be easily replaced by simply removing the tag from the cradle with a supplied security tool and removing a single screw to access the battery.

The disclosed and preferred RF tags operate in the BLE frequency band 2400-2800 MHz and in the 900 MHz ISM band and dissipate power less than 1 uW for both functional operations of receiving signals from RF beacons as well as communicating with the UHF gateway.

However, it will be understood that the choice of frequency is a matter for those skilled in art, taking into consideration other design choice issues as to radio frequency, modulation type, broadcast amplitude, antenna configuration, etc. In this regard, it will also be understood that although BLE may be preferred for many applications, the invention is not limited to any particular RF signals sources or characteristics.

In a preferred aspect of the disclosure, the microprocessor 830 on the preferred tag 25 assembles and transmits a tag data package in response to detection at a tag that was previously detected as moving, is determined to be at rest for a predetermined length of time. In accordance with this aspect, the microprocessor on the tag is "awakened" in response to movement of the tag, e.g. by a controller interrupt from the motion sensor, and thereafter monitors the motion sensor at periodic (short) intervals until it is detected that the motion has stopped and has remained stopped for a predetermined "at rest" period of time. Once the predetermined "at rest" time has elapsed, the tag takes readings of the beacon signals and/or other IRFSS, assembles a tag data package, and transmits the tag data package to the object location system.

Once the tag data package arrives at the object location system 10, the system can predict the object's location by constructing and using appropriate data models based on the tag data package, and/or retrieving preexisting data models and making an object location prediction. This object location prediction can be stored for subsequent retrieval by a customer, and/or provided in real time, in accordance with a particular customer's configuration for notification as to location of the particular object.

FIG. 9 illustrates an alternative configuration of a dual mode RF tag 25' according to another aspect of this disclosure, in particular relating to detection of proximity of a device within a predetermined distance, e.g. ten feet, which is arbitrary, in connection with an object location operation. The embodiment of RF tag 25' is predominantly the same as for the tag 25 described in connection with FIG. 8, except that it is configured for other functions in addition to receiving signals from beacons and/or other IRFSS. According to one aspect, the tag 25 is configured to receive information via the BLE communication band from a transmitter (not shown) operated by the system operator for effecting additional location or other functions.

According to an aspect, the BLE receiver 910 is configured to receive signals from the object location system, for examples from transmitters other than stand-alone independent location beacons, to effect certain actions in tag, for example and not limitation: (a) remote configuration of a tag 25 to provide it with object identification and/or customer identification data, (b) actuate a visual indicator, (c) actuate a sound generating device such as a buzzer or speaker, and/or (d) transmit "on demand" any stored information contained in the on-board memory such as RF beacon signals (and/or a history of beacon signal reception over a predetermined time period), prestored customer ID or object ID information.

In this regard, the disclosed alternative RF tag 25' is preferably also provided with an output from the microprocessor 930 (which typically includes one or more on-board driver circuits which may be configured for driving LEDs or sound-generating devices or electronic switches) for coupling to an LED visual indicator 960, and/or a buzzer or speaker 970 for generating a sound on demand by signal from the microprocessor. A particular useful function of the dual mode tag 25' in FIG. 9 is that for "last ten feet" detection, as will be described next.

Last Ten Feet Detection (a/k/a Object Proximity Detection)

Still referring to FIG. 9, and according to another aspect, a dual mode tag such as the tag 25' includes one or more indicators e.g. 960, 970 that can be activated in response to a prompting or trigger signal provided by a user with a survey device or smartphone 60 having Bluetooth capability or a portable object location device 950. In accordance with this aspect, the indicator(s) is actuated by prompting from such device with a Bluetooth signal containing a command to actuate. Such a configuration allows physical location of a particular object and its tag 25' within the "last ten feet", it being understood that the actual distance is arbitrary and depends on other factors such as battery conservation and aspects of the RF environment. It will also be understood that such a "last ten feet" location function is typically conducted once a particular subspace or room has been previously identified by operation of the object location system 10, and a user is dispatched to the identified subspace with a portable object location device 950 or other device for purposes of physically finding the object, perhaps among a number of other similar objects, or similar packages for objects, or in a cluttered environment.

In this regard, an RF tag 25' is provided with some type of indicator or signaling device that is capable of alerting a user of proximity to the located tag and device. Examples of suitable indicators or signaling devices include but are not limited to a light or LED 960 or sound-generating device 970 as shown in FIG. 9. Signaling devices can include other types of devices such as haptic feedback devices (buzzers/vibrators), a smartphone display notification, or any other device that can be actuated to alert a user when he or she (or an autonomous device such as a robot) is sent to physically locate and perhaps retrieve an object.

Such a portable object location device 950 may also be a mobile telephone with a Bluetooth radio circuit, as the preferred tag 25' is capable of receiving Bluetooth transmissions from sources other than BLE beacons.

Alternatively, the portable location device 950 may be the same as the survey device 60 used to receive signals from beacons for survey purposes, but also configured to transmit BLE signals back to the tag. According to this aspect, the survey device 60 or other portable location device 950 transmits a trigger signal, preferably limited to the object that is to be located, upon entering the pre-identified room in which the object is predicted to be located. In accordance with an aspect, the portable location device is supplied with an identifier of the object to be located, the transmitted trigger signal contains the identifier, and each tag is configured to respond only to a trigger signal that includes the identifier that is specific to that tag and object.

According to these and related aspects, when a user having such a portable object location device 950 approaches the identified object whose location is to be determined physically by the user, after having been previously informed of a particular room or subspace in which the object is predicted to be located, the object location device transmits a predetermined trigger signal via BLE to the tag 25', which in response to the trigger signal actuates the indicator (tag-local beacon, light, sound generator, haptic, etc.) to signal of its nearby proximity.

According to a related aspect, the portable object location device 950 such as a mobile telephone may be provided with an application that sends a command to the tag 25' that causes it to flash the LED or sound the audible alarm, thereby enabling the user to find the object rapidly even when it may be located in an area with other nearby identical objects or packages.

Object Location System Architecture

FIG. 10 illustrates the hardware architecture of aspects of the objection location system 10, in particular details of the object location engine 700 and location services 720 in FIG. 7, and customer services module 770. In particular, the disclosed object location engine 700 comprises an API gateway 1010, location integration service 1020, packet pre-processing 1030, and a rules engine 1040. The API gateway 1010 provides a connection portal to the UHF radio gateway 710 so as to receive information transmitted by tags 25 associated with objects 20 in the master space. A principal component of the gateway 710 is a UHF radio gateway 712, which includes one or more gateway receivers, or is coupled with a network of distributed gateway receivers, that receive the tag signals. According to one aspect, the gateway 710 may also include comprises other location data APIs or inputs (not shown), for example, location information can be received from third-party location service partners that may provide cellular radio type tags that can be deployed in connection with the system 10.

It will be understood from the discussion in connection with FIG. 3 that a mobile device such as RF scanning device 60 or collection of one or more tags is used for scanning a master space in a survey operation for purposes of building and/or maintaining one or more data models, as described elsewhere herein. The gateway receivers 712 may include specific interfaces or protocols for communicating with devices such as a survey device, or a portable object location device 950 as discussed in connection with FIG. 9.

The API gateway 1010 is preferably implemented by a computer service such as Amazon Web Services (AWS), a cloud-based computing service provided by Amazon Web Services, Inc., Seattle WA USA, which allows deployment of a readily scalable system that can handle a large variety of users and master spaces for use by a number of different entities. Details of use of the AWS for data input services is available from the service provider.

The API gateway 1010 provides location data inputs to other components of the object location engine 700, namely, raw RF packet data 1014 received from the disclosed UHF radio gateway 712.

The location integration service 1020 of the object location engine 700 collects location information received from the location services 720, as described elsewhere. The location integration service 1020 provides location data from a prior object location operation that can be combined with current location data derived from the RF tags 25, so as to provide an "integrated" or combination location data for use in locating objects, and/or refining the training data.

Still referring to FIG. 10, the raw RF data packets 1014 comprise data obtained from transmissions from RF tags 25, received via the API gateway 1010, to a packet pre-processing service or component 1030, which disassembles the raw RF packets and obtains the information contained in the tag data packages such as RSSI indicators, tag ID information, and object ID information. This data is thus prepared for storage into databases, as discussed elsewhere, and also for backup to a data backup system.

According to an aspect, both the location integration service 1020 and packet preprocessing service 1030 are implemented in the cloud with AWS Autoscaling EC2/JVM cloud-based data processing services provided by Amazon Web Services, Inc., Seattle WA, USA.

Outputs in the form of messages, identified as SensorMsg 1035, from the location integration service 1020 and packet-preprocessing service 1030 are provided to a collection of functions shown in FIG. 10 as a rules engine 1040, which is also preferably implemented in the cloud, e.g. via AWS Autoscaling EC2/JVM services. The rules engine 1040 provides services including but not limited to a real-time location service (RTLS) 1042, a geofencing service 1044, a sensor threshold service 1046, and a custom rules service 1048.

According to one aspect, the RTLS (real time location system) service 1042 is operative for the primary function of accessing one or more data models stored in the system 10 and maintaining by the location services 720, and generating specific location information (e.g. a particular room or subspace) of a particular object associated with a particular tag, on demand by a user or customer of the system. Thus, the RTLS service 1042 provides one of the primary functions of the disclosed system and its advantages. The RTLS service 1042 is coupled to the location services component or services 720 for accessing the one or more data models.

The geofencing service 1044 is a specialized function according to a complementary aspect of this disclosure. In particular, a "geofence" will be understood by those skilled in the art to be a virtual "fence" for confining an object within a particular predefined space. In particular, a geofence is useful for detecting whether a particular object might be moved from one particular location or subspace or room to another location or subspace or room. Such a geofence is useful for detecting unauthorized movement of an object (such as theft, deliberate mislocation, or inadvertent mislocation. A geofence is constructed by a user that inputs one or more rooms or subspaces within which particular objects are permitted to reside, in association with object ID and customer ID, and maintains the list of permitted rooms in a database, and access the database to determine room location in response to the movement actuation of a tag 25 associated with a particular object that is subject to geofencing.

According to one aspect, the sensor threshold service 1046 provides a function that permits limited movement of an object within one or more rooms or subspaces, before triggering an alarm of other indicator of movement of the object. This function can be implemented in conjunction with geofencing. In accordance with a sensor threshold service, the system maintains a predetermined distance movement threshold value, or alternatively an RSSI signal threshold value, for a particular object, in association with object ID and customer ID. In response to a signal of a tag 25 indicating movement of a particular identified object, a new location of the object is compared to the threshold value (distance and/or RSSI value), so as to determine whether the object has moved a sufficient amount, as indicated by a change in the distance (or RSSI) values from an initial value when the object was last located, to a different values. In the event that the determined movement of the object exceeds the predetermined change threshold, there is an indication that the object has moved sufficiently to note the change in position, and perhaps trigger an alarm of movement. Such a sensor threshold service is useful for allowing limited movement of objects within an approved subspace, without necessarily triggering an alarm.

A custom rules service 1048 is also provided so as to store custom rules provided by users or customers, as may be determined from time to time.

Still referring to FIG. 10, the location services 720 provides two major functions in the disclosed object location system 10: a model training function 1070 and a model lookup and prediction function 1080. Both the model training function 1070 and model lookup and prediction function 1080 are implemented in the disclosed embodiment by AWS SageMaker service provided by Amazon Web Services, Inc., Seattle WA, USA, or alternatively by a TensorFlow open source ML platform. As known to those skilled in the art, AWS SageMaker is a fully managed cloud-based service that provides services for building, training, and deploying machine learning (ML) models quickly. TensorFlow is an open source machine learning model building and deployment platform, details of which are available at http://www.tensorflow.org. As will be appreciated, the TensorFlow ML environment may be implemented within services provided by AWS.

According to one aspect, the model training function 1070 is implemented with a machine learning (ML) function, which is species of artificial intelligence (AI) technology. In the disclosed embodiment, the preferred ML function is a Support Vector Machine (SVM) algorithm, the general operations of which are known to those skilled in the art. The SVM accesses data in the survey database and/or training database 730, and creates one or more SVM data models that are used for object location prediction, based on RSSI values provided by a tag 25 that are activated to transmit its tag data package containing such RSSI values. Further details of the preferred SVM algorithm are described below. A data model formed from processing the survey data and/or training data in the respective databases is then stored in the model storage database 750, shown in other figures.

According to one aspect, the model lookup and prediction function 1080 is an application algorithm that accesses models constructed by the preferred SVM stored in the model storage database 750, and provides a prediction output comprising a location prediction (identification) of a particular subspace in which a particular, pre-identified object 20, as associated with an identified tag 25, may be located. According to a related aspect, the model lookup and prediction function 1080 accesses one or more data models, e.g. as discussed in detail below, and processes the received RSSI values from a tag data package against the one or more data models to arrive at a prediction candidate, which is provided as the location prediction output.

According to one aspect, a location prediction output for a particular object from the model lookup and prediction function 1080 is provided to a location fixes service 1012 for use in a location integration service 1020. The location integration service 1020 combines the predicted location for the tag and associated object with data corresponding to the tag data package that triggered the location operation, to form "scan" associating the RF values of the tag data package with the predicted location of the tag and object. The location integration service 1020 and the packet preprocessing function 1030 generate data messages SensorMsg, as described elsewhere, which are further handled by the rules engine 1040, according to the particular function invoked, e.g. geofencing, sensor threshold, any custom rules, or in case of a new incoming tag data package, an RTLS lookup function and location prediction.

The location services 720 accesses data in the survey database 730, the model training database 740, and the model storage database 750 (not shown in FIG. 10) for purposes of constructing one or more data models for machine learning of a master space and its associated subspaces, maintaining those models with additional data and "machine learning" (i.e. updating of the data models) resulting from object location operations, and also for conducting the primary function of object location by invoking and running one or more data models in response to an object location operation. Typically, an object location operation is triggered by a "command" from the RTLS lookup service 1042, which provides data received from an RF tag 25 indicating its set of RSSI values, object ID, and customer ID, among other potential data items, and uses that data to run a data model to obtain a prediction candidate for a likely location of the particular object associated with the tag that provided the data. As previously described, a tag typically provides its tag data package in response to detection that a tag (and its associated object) have stopped moving, after of course beginning to move.

As indicated above, the various functions of the rules engine 1040 provide several outputs for utilization by various functions associated with the system 10. For example, and further to that as described above, the RTLS lookup function 1042 provides location information as to a predicted location for a particular object from an object location operation to customer services function 770. And although not shown, information from an object location operation is also provided to the training data base 740. It will be understood that location data from a located object may be added to the training database 740, in which case the database may more properly be considered a "location data storage database," as it contains data used for initial training of the model, plus updates from changes to the RF environment as detected by other functions, as well as location data from actual object location operations. All of such data forms a part of the machine learning database and used to refine the model subsequent to initial training. By updating the training database to include location data from actual object location operations, as well as from detected changes in the environment due to beacon failure, new beacon additions, moved beacons, changes in the physical infrastructure such as changes to shelving, doors, walls, etc., the data models used for object location prediction are dynamically updated for subsequent object location operations.

In the disclosed embodiment, the survey database 730, the training database 740, and the model storage database 750 are all implemented in cloud-based data storage services provided by Amazon Web Services, Inc., Seattle WA USA, such as AWS S3, AWS SQL, and/or AWS ElasticSearch, details of which are available from the service provider. It will of course be understood and appreciated that databases can be maintained in other known manners such as with local storage or by use of other cloud-based data storage services, as determined by one who builds and operates an object location system 10 as described herein.

FIG. 10 also illustrates aspects of customer services function 770, as introduced in FIG. 7. Customer services 770 provides application programming interfaces (APIs) into the disclosed object location system 10 (not shown in FIG. 10) for the purpose of allowing users such as customers of a provider of the system 10 to input their information as to objects to be located and/or tracked, aspects of the master space and its associated subspaces including the surveying thereof, and conducting object location operations to locate specific objects within the user's respective master space(s).

In the disclosed embodiment, the customer services functions 770 are implemented with various AWS services and storage facilities, as for other functions in the system 10. An API service (not shown) provides an interface to the Internet 40 or other data communication network so that particular customers or users can employ mobile devices such as networked computers, data tablets, cellphones, or other devices to conduct survey operations and object location operations using applications that execute on such devices. These operations generate API queries, for example, to access and invoke functions of the system 10. The API services include functions such as a load balancer for handling and balancing a number of simultaneous/high volume of operations in the system, a monitoring and observability service for providing metrics as to operations and performance of the system, an API endpoints service for providing web-based access to the system by users, and an event notification service for generating real-time information to users including automatically updated object location information, violations of geofence rules, and/or movement threshold indications. In the disclosed embodiment, these aspects are implemented respectively by AWS Elastic Load Balancer, AWS Cloudwatch service, API Endpoints service, and AWS SNS event notification service, all provided by Amazon Web Services, Inc., Seattle WA. Details of these cloud-based services are available from the service provider. These services store and retrieve data in the customer database 760, also provided in the disclosed embodiment by Amazon Web Services, but of course may be implemented locally in a user's facility or via other cloud-based storage and web-accessible service providers.

Exemplary Training Data, Object Location Prediction, and Model Update

Turn now to FIGS. 11 and 12 for a discussion of exemplary data used in constructing a data model of a master space and associated subspaces, based on use of pre-collected survey data, of exemplary data in use of a data model to generate an prediction candidate for the location of a particular object, and of updating a data model based on subsequently-acquired data from object location operations or changes to the RF environment, respectively. FIG. 11 provides one example of exemplary data, and FIG. 12 provides another example of exemplary data.

FIG. 11A illustrates an exemplary data table of RSSI data values, expressed in dBm, that represent the results of a survey operation by a user of the disclosed object location system 10. Each row in the table in this figure represents a single "scan", comprising a collection of RSSI data values. The data values represent a plurality of data values obtained by use of a survey device 60, after a user has obtained RF data samples within a plurality of exemplary subspaces or rooms Room A, Room B, and Room C in a survey operation. Each data value in the table represents RSSI value measured by a survey device, for example at sample locations Si, S2 . . . Sn, taken within a predefined subspace of a master space. Preferably each sample—e.g. Si in FIG. 11A—will include the RSSI values measured from one or more RF channels of an RF beacon, assuming that each RF beacon provides one or more discrete RF channels. For example, note in FIG. 11A, on the first row of the table, that a beacon identified as Beacon1 has three channels, Ch1, Ch2, and Ch3, each transmitting at a different frequency within the specified RF band for the beacons deployed in the master space. Sample S1 has RSSI values of −70 dbM, −68 dbM, and −69 dBm, as measured within Room A. Similar samples e.g. S2 are taken of RF signals from other beacons with multiple channels, e.g. Beacon2 and Beacon3, in the example shown. Assume further that another set of data samples is taken within Room A, preferably at another physical location within Room A as represented in the second row of data values in the table. Preferably, each set of data samples is taken at a different location within the subspace being surveyed.

In a similar manner, other data samples are taken within the subspaces Room B and Room C, capturing RSSI data from various locations within each subspace from signals as received from beacons whose signals are detectable within that subspace, to build out a data table such as that shown in FIG. 11A. Such a table of data values is then used to train and deploy a machine-learning model. In FIG. 11A, the data values for the first two rows represents a first data model Model A. In like fashion, the data values for the next two rows represent a second data model Model B, and the last three rows represent a third data model Model C. These data values and their respective identifiers for data Models A, B, and C are then stored in the survey database 730, and once the models are identified, the constructed data models are stored in the Training Database 740, for access by the model training function 1070 (FIG. 10). Once a set of data from a survey is used in building a data model, that data is transferred into the model storage database 750.

FIG. 11B illustrates an exemplary data table of RSSI data values, expressed in dBm, that represent the results of an object location operation by a user of the disclosed object location system 10. In the example, a plurality of data samples provided in tag data packages from an RF tag 25 are provided by a set of scans or data acquisition samples of beacon signals received by RF tag and transmitted to the object location system for an object location operation. The example shown has four (4) scans or sets of data samples, as represented by the four rows in the table, taken from signals received from three beacons Beacon 1, Beacon 2, and Beacon 3, whose signals are detectable by the RF tag 25. As shown, each beacon has three RF channels, Ch. 1, Ch. 2, Ch3. It is believed that at least three sets of data samples from a tag provide acceptably reliable location operations, although predictions may be made with more or fewer data samples.

In the example shown, each set (row) of data samples from a tag 25 that receives the RF beacon signals from the three beacons is run against a location prediction algorithm that accesses one or more data models built from a prior survey and data model training operation. Note that three of the four sets of scans have resulted in the prediction of Room A as the likeliest location for the object 20 whose tag 25 obtained the RF beacon signals and transmitted them to the system for the location operation. Note that one of the sets of data (the third row), resulted in the prediction of Room B. In accordance with one aspect of the present disclosure, a weighting or "voting" algorithm is used to determine that the three predictions of Room A outweigh (outvote) the single prediction of Room B, such that a location prediction of Room A is output by the system as the determined location of the object associated with the tag that provided the data.

FIG. 11C illustrates an exemplary data table or schema of RSSI data values, expressed in dBm, that represent the results of an object location data update and/or model maintenance operation resulting from additional data obtained by use of the disclosed object location system 10. In the example shown, assume that the first four rows of data (RSSI value) from an initial set of scans of values from a tag.

Assume further that the data items used in model construction and maintenance now include additional data items from any one of a number of additional sources, e.g. known static objects or tags, newly added beacons, confirmed object tag location operations, triggered environment changes, follow up surveys, beacon failures, diminished RF signals, moved or replaced beacons, added or removed external IRFSS, etc. Such additional data items are shown in FIG. 11C as "additional scan data", and are used to update, reinforce, and/or maintain the data model constructed in initials scans from an initial survey. In the figure, two (2) additional data items are shown, reflecting in this particular example the receipt of signals from beacons Beacon1, Beacon2, and Beacon 3, and from different RF channels of such beacons. Although this exemplary schema shows signals from beacons, it will be understood that such additional scan data can be obtained from other identifiable RF signal sources (IRFSS).

It will be understood in connection with FIG. 11C that the additional scan data is used to run the data model and determine (or verify) that a particular room, e.g. Room A, Room B, is predicted to be the location of the receiver that generated the additional scan data. Upon updating the data model using the additional data continuously in response to triggered circumstances such as beacon failure, or object location operations, or in response to follow up surveys.

According to a related aspect of FIG. 11C, it will be understood that the disclosed system and methods contemplated at least three different ways or methods for reinforcement of data models constructed as described herein. Examples of such situations are described above in connection with FIGS. 4, 5, and 6. Such methods involve use of data from circumstances or conditions detected in the RF environment, stationary or static tags, additional or removed beacons, and providing additional data scans such as those shown in FIG. 11C for use in subsequent model construction and usage or subsequent object location predictions. For example, a first reinforcement or updating method involves user intervention for correction of an erroneous subspace prediction. In this method, the system provides for user entry of a corrected room or subspace identifier in the training database, in response to a user determination that the system has erroneously predicted an object location. In such a method, the system may provide for user override of the incorrect prediction, and/or provision of a corrected subspace identifier for the tag data that prompted the erroneous subspace prediction.

A second reinforcement or updating method involves the inclusion of additional scans into the training database in response to a determination that the RF environment may have changed, or by the inclusion of additional beacons or RF sources, or the utilization of static of stationary tags such as shown in FIG. 4. This may be determined by the occurrence of mispredicted locations, as well as the identification of initial survey scans that included signals from beacons or other IRFSS that are no longer present or are significantly attenuated, and replacement and/or updating of scans forming the data models.

A third method involves automatic reinforcement based on each successful object location operation. In this method, the data from each successful object location prediction, as represented by the tag data package with the scan at prediction time, is provided to the training database for use in subsequent model construction and usage.

FIG. 12, consisting of FIGS. 12A-12D, is another example of exemplary data derived and used in aspects of the present invention(s), in connection with, respectively, a survey operation, training of a ML database, adjustment of data used in construction of models used for object location prediction, and model construction by assigning rooms (subspaces) to particular sets of adjusted data values.

FIG. 12A illustrates exemplary data derived in an initial survey operation or process, as described in this disclosure. As indicated in the figure, a survey operation or process provides data, exemplary data of which is illustrated, collected in scans Sn collected from beacons Bn in indicated rooms identified by Room Label Rn as a result of survey scan within the identified room. During the survey process, a room or subspace label is associated with each scan, as represented by a Scan ID data value. The data in FIG. 12A is considered an initial survey scan.

It may be noted in FIG. 12A that certain scans, e.g. scans 51, S2, S3 provided no data from beacons B4, B5, and B6, for room R1, and scan 51 provided no data from beacon B3 for R1. Likewise, scans S7, S8, and S9 provided no data from beacons B3, B4, B5, B6, and scan S8 provided no data from beacon B7, for room R3. "No data" in this example means that the signals received from those respective beacons were either totally missing or alternatively below some predetermined threshold, e.g. less than −120 dBm.

Also in FIG. 12A, note that the scans from the survey labeled with room R2 has a distinctively different set of values. This survey data indicates that the rooms R1 and R3 have signals from a set of beacons that have a number of the same beacon identifiers, i.e. beacon B1, B2, B7, B8, and B9. In order to conduct an object location operation, a plurality of data models are constructed using this survey data, and allow selection of which room a particular object is located, based on a scan taken at the time of object location prediction.

FIG. 12B illustrates both an exemplary scan from a tag associated with an object to be located at prediction time, as well as the result of a selection or determination of a set of survey scans from the data in FIG. 12A from the initial survey database to use for model construction. The selection of scans Sn for use in model constructing and training is based on scan data from a tag at prediction time. An exemplary process for constructing a set of training data for the ML SVM classification algorithm thus involves, at Step 1, selection of a set of survey scans Sn for model construction based on the RSSI values from a scan from a tag that is to be located. In this case, because the tag to be located has received signals from beacons B1, B2, B7, B8, and B9, and because scans 51, S2, S3, S7, S8, and S9 in the initial survey data show significant signals from the same beacons B1, B2, B7, B8, and B9, the data from these initial survey scans are selected for model construction. In accordance with an aspect of this disclosure, provided that a predetermined percentage of the beacons, for example 75%, in an initial survey data item Sn have values from beacons (represented by beacon identifiers) that match the beacon identifiers received by the tag to be located, such initial survey scans are used in training. For example, and in other words, if a particular initial survey scan Sn has data values for at least 75% of the same beacons in the tag data, then that scan value may be selected as training data for model construction.

Note in FIG. 12B that two of the initial scans S2 and S8 show zero values from beacons B8 and B7, respectively. Still, in this example, 80% of the beacon identifiers (4 out of the 5 in the prediction time scan data) in the scans S2 and S8 are the same as in the prediction time scan data. Thus, scans S2 and S8 are still eligible for use in training, according to this particular aspect of scan selection for model construction. Note also, and as discussed next, the presence of the zero values creates a certain complication in model construction.

FIG. 12C illustrates the exemplary training data of FIG. 12B, below the scan data from the tag at prediction time for comparison, showing the adjustment of certain training data by insertion or inclusion of data for certain beacons, for completion of model construction in accordance with a particular aspect of the present disclosure. Note that at Step 2, the initial survey scans for S2 and S8 in FIG. 12B had zero values for one particular beacon of the five indicated (B8 and B7, respectively) but otherwise had values for four other beacons. In accordance with this aspect, the zero values are replaced with values that represent an interpolation of values from adjacent scans, it being understood that that scans 51, S2, and S3 were all associated with room R1, and scans S7, S8, S9 were all associated with room R3.

Having a zero value for scans where most of the values are reasonable is perhaps anomalous, and according to this aspect of the disclosure, will be replaced by a value determined by a predetermined statistical computation or pure interpolation so as to provide a meaningful value for use in object location prediction. In the example shown for scan S2 in the training data, the value of –117 dB is inserted, as average of the adjacent values from S1 and S3 from beacon B8. Similarly for scan S8, the value of –97 dB is inserted, as an average of the values from S7 and S9. Although a statistical average is used in this example, it will be understood that other statistical computations may be employed to fill in for missing and/or anomalous values, such as pure interpolation, median, mode, or other types of statistical values.

In FIG. 12C, once any anomalous or missing values are filled in, the training data may be considered completed and ready for use in model construction and object location prediction.

FIG. 12D illustrates two particular data models in accordance with an aspect of this disclosure. This figure illustrates the assignment of a first data model Model R1 associated with room R1, and a second data model Model R3 associated with room R3, based on the collection of a set of initial survey scans (survey data) as shown in FIG. 12A, training of a ML algorithm by selection of a predetermined set of survey scans from the initial survey scans based on the RSSI values of a tag data scan at prediction time for a tag associated with an object to be located as shown in FIG. 12B, as such a set of selected survey scans may be adjusted to compensate for anomalies and/or missing values as in FIG. 12C.

FIG. 12D illustrates the data resulting from construction of a data model for room R1 and R3. At Step 3a, model identifier Model R1, comprising scans Si, S2, and S3, as adjusted in a manner as previously described, is assigned to these scans. At Step 3b, a model identifier Model R3, comprising scans S7, S8, and S9, as similarly adjusted, is assigned to these scans. At Step 3c, a binary version of these data models is stored in the model storage database 750 (FIG. 7).

Still referring to FIG. 12D, in accordance with aspects of this disclosure, an object location prediction is conducted upon construction and/or retrieval of the constructed training data models. As described elsewhere herein, an object location operation involves prediction of the room in which the object to be located is most likely found, based on the tag data from the scan from a tag associated with the object to be located at prediction time. In accordance with aspects of this disclosure, a ML algorithm, a SVM in the disclosed preferred aspects, is applied to the data in the constructed models (Model R1 and Model R3 in the example shown). In this example, a typical classification algorithm, such as SVM, will return room (subspace) R1 as the room in which the tag and its associated object is most likely to be found. Flow Charts of Processes for Survey, Survey Pre-Processing, Model Training, Model Serving Turn next to FIGS. 13-17 for a discussion of flow charts of various computer-implemented processes that are executed by the object location system 10 constructed in accordance with aspects of this disclosure. These flow charts are examples of steps that can be used to implement various functions of the disclosed object location system in a networked computer system, having a location gateway 710 for receiving RF signals from RF tags 25 associated with an object 20 to be located, which is coupled to an object location engine 700 that carries out survey operations, model building and training, object location, in conjunction with user-provided information relating to the defining of subspaces or rooms within a master space, object ID, customer ID, and other data items used in carrying out the functions described herein. According to one aspect, it will be appreciated that the steps described in the flowcharts described are carried out in computer code executed on the various cloud-based computing and communicating components described above, in particular in FIG. 10.

FIG. 13 is a high-level flow chart that illustrate primary computational data collection, model training, and object location operations that are conducted in order to carry out the functions required for object location in accordance with this disclosure. Each of the major steps shown in FIG. 13 are effected by a computer program process that is executed in the object location system 10, constructed as described herein. First, at process 1400, the master space in which objects to be located may be found is surveyed, to obtain RF data samples of the RF environment of the master space and assigned appropriate subspaces or room identifiers. At process 1500, the survey data from a survey operation is pre-processed to build a training database. At process 1600, one or more data models are constructed by selection of a set of scans from the initial survey database based on values received from a tag associated with an object to be located. At process 1700, an object location process is conducted by executing selected data models and predicting a room in which the object is likely to be located. As shown, data from an object location operation 1700 are fed back to the model training process 1600, as in certain aspects of this disclosure the data models used for object location prediction are continuously updated with data from successful object location predictions. Details are these major processes are described below.

FIG. 14 illustrates steps that can be used to implement a survey function or process 1400, identified in FIG. 14 as a field survey application (app). Starting at step 1405, a survey function begins upon a command, for example from a survey device 60 as shown generally in FIG. 3, which contains an application for collecting RF data samples from beacons in a master space, from a receiver associated with or built into the survey device 60. Such a begin survey command is shown as "Start Measurement Session." In a measurement session, the survey device is activated and deployed within one or more subspaces or rooms within this master space, and the associated receiver receives beacon signals, preferably multi-channel, from one or more beacons whose signals propagate into the subspace being surveyed.

At step 1408, a session ID is generated to identify the particular survey session being conducted. At step 1410, a customer site number for the master space is retrieved from the customer database 760. The customer site number is used to associate a particular master space and its identified subspaces with a particular user or customer. The customer site number may include a subspace or room identifier for association with RF data samples obtained within the room being surveyed. At step 1413, the survey device begins collecting RF data samples within an identified subspace.

At step 1415, a "zone label", also known here as a subspace identifier, and its coordinates within the master space, are identified based on customer site information, and written at step 1418 to a Location List, as shown in the accompanying table. According to one aspect, a Location List comprises data items including but not limited to the session identifier (SessionID), a start time for the session (SessionStartTime), a customer identifier (CustomerLabel), one or more master and/or subspace identifiers (ZoneLabel), and one or more location identifiers (LocationNumber) associated with the master space and/or associate subspaces, coordinates of the master space and/or associated subspaces as may be required (X Coord, Y Coord, Z Coord) for a three dimensional master space, and, if desired, a reference to a predetermined map of the space and subspace maintained by the user (Map Point Ref). These data items are associated with a customer or user LocationNumber at step 1420. The LocationNumber data item is a customer-supplied data item that distinguishes one particular location associated with a customer or user, within a plurality of locations. The data items, as listed above and as shown in the accompanying Location List table, are then stored (uploaded) in the survey database 730 at step 1422.

After step 1415, a scan identifier (Scan ID) is generated at step 1425 to identify the particular scan or data acquisition operation for obtaining RF beacon signal samples, and the survey device 60 begins to collect the RF beacon signal samples, or signal sample from any other RF sources that are used as IRFSS. At step 1430, the RSSI values of multi-channel beacons are collected and stored, in association with a particular location in the master space and subspace, and associated with Location N, where N will increment for each sample location 51, S2, Sn. At step 1432, the scan is completed for that sample location 51, and the data values are recorded or written at step 1435 to a measurement log, as shown in the accompanying table. According to an aspect, the Measurement Log comprises data items including but not limited to SessionID, SessionStartTime, CustomerLabel, SiteLabel (identifying a particular master space), ZoneLabel (identifying a particular subspace or room), a scan identifier (ScanID), a scan start time and duration (ScanStartTime, ScanDuration), a time at which a beacon signal is received (PacketReceiveTime), a beacon identifier (BeaconMAC), and the signal strength measurement itself (RS SI) of the particular data value of a particular channel of a particular beacon.

In addition, and although not shown in FIG. 14, a data item for the Measurement Log may include a channel identifier (Channel ID) for configurations that involve multi-channel beacons or other multi-channel RF sources as IRFSS, as well as value or data item representing the frequency or frequencies of a beacon or other RF source.

The Measurement Log written at step 1435 is then associated with a user Location Number established at step 1420 and uploaded at step 1422 to the survey database 730.

After writing a Measurement Log at step 1435, the inquiry is made at step 1440 whether additional scans at additional sample locations are to be made, and if so, the process returns to step 1425 and another scan is initiated. If at step 1440 the user conducting the survey has completed his or her survey of the master space and associated subspaces, the process passes to step 1450 and the survey process is complete.

FIG. 15 illustrates steps that can be used to implement a survey data pre-processing function or process 1500, identified as a Survey Pre-Processing application (app). According to one aspect, a survey pre-processing process is carried out so as to transform survey data as stored in the survey database 730 into data that is used to construct (i.e. train a machine with "machine learning") one or more data models that are used for location of objects. The output or result of the pre-processing function or process 1400 is stored in the Training Database 740.

Another purpose of the Pre-Processing app 1500 is to normalize the RSSI values obtained during a survey of a master space so as to compensate for variations that might occur as a result of use of different RF beacons having somewhat different characteristics, e.g. from different manufacturers, calculate mean values of RSSI values for a various locations within an identified subspace so as to identify aberrations that might occur due to beacon malfunction, additional beacon placement, beacon movement, and other issues.

Starting at step 1505, a survey pre-processing function 1500 accesses data in the survey database 730 collected during a prior survey operation, and first counts the number of distinct beacons detected during the survey. Such a count is effected by a pass through all data samples in the survey for a specific master space and identifying all unique MAC (media access control) addresses for beacons. It is understood at this juncture that each beacon has a unique identifier so as to distinguish signals from different beacons; all beacons deployed in a master space should have a unique identifier that is provided as a part of the beacon's signal. A MAC address is a convenient identifier for this purpose. Upon counting all unique MAC addresses in the survey data of the specified master space that was surveyed, at step 1508 data corresponding to this count is written to a beacon metadata file, as shown in the accompanying table, and stored in the training database 740. The data items in the beacon metadata file include but are not limited to the following: a user or customer identifier (CustomerLabel), an identifier of the specific master space associated with the particular survey data being pre-processed (SiteLabel), and a list of all beacons detected in the survey by beacon identifier (BeaconMAC).

After the counting of the unique number of beacons detected in the survey, after step 1505, the RSSI data values for each unique beacon from the survey device 60 are normalized at step 1510. The normalization of RSSI values is for the purpose of determining the variation in a RSSI values that were detected in the survey. In other words, it is expected that the RSSI values for all RF beacon signals will vary according to some function, and that there will be a maximum value seen and a minimum value seen, a mean value of all the values of a particular beacon, and a standard deviation of those values. This normalization assists in later object identification error detection using data from a particular RF tag, if for example a value significantly above or below the mean is seen, e.g. more than 2 standard deviations rom the mean, which may indicate an anomalous RSSI value read from a tag. After the normalization calculations are completed for the data associated with each individual beacon are completed, a Preprocessed Beacon File for the beacons is created at step 1515. Data items in the Preprocessed Beacon File, as shown in the accompanying table, include but are not limited to: a customer or user identifier (CustomerLabel), an identifier of the particular master space of the survey (SiteLabel), a time stamp associated with the survey (SessionStartTime), and a list that associates beacons with particular zones (rooms or subspaces), namely: a zone identifier (room or subspace identifier (ZoneLabel), the mean value and standard deviation of the RSSI values seen in that zone for each beacon (e.g. MAC 1 RSSI Mean, MAC 1 RSSI StdDev . . . MAN N RSSI Mean, MAC N RSSI StdDev).

Also after step 1505, the RSSI data from the survey is associated with each particular zone (area, room, subspace) at step 1520, in a Per-Zone Data collection. The data items in the Per-Zone Data collection, as shown in the accompanying table, include but are not limited to a user or customer identifier (CustomerLabel), an identifier of the master space associated with this survey data (SiteLabel), a time stamp of the survey (SessionStartTime), a zone identifier (area, room, subspace), and data of the survey samples S in the form of Category (−1/1)

identifying a channel and RSSI value, and the sample data in the form of MAC 1 Mean, MAC 1 StdDev . . . MAC N Mean, MAC N StdDev. The Per-Zone Data is then written to the training database 740.

FIG. 16 illustrates steps that used to implement a ML model training function or process 1600, identified as a Model Training application (app), according to one aspect of the disclosed invention. According to one aspect, the Model Training app 1600 is run against each specific zone (area, room, subspace) so as to generate a data model using the training data in the training database 740, and the resultant data model(s) are stored in the model storage database 750. According to one aspect, the machine learning model construction involves construction of a Support Vector Machine (SVM), which is known to those skilled in the art as a supervised machine learning model that uses classification algorithms for a two-group classification problem: whether a particular object, as indicated by data provided by an associated tag 25, is or is not, predicted to be in a particular room or subspace, identified as a zone (ZoneLabel).

The Model Training app 1600 has two nested routines or procedures: a Parallelize per Zone process 1605 and a Parallelize per parameter choice process 1610. Those skilled in the art will understand that when training an SVM, the user needs to make a number of decisions: how to preprocess the data, what type of kernel to use, and finally, setting the parameters and hyperparameters of the SVM and the kernel. Kernels in an SVM will be understood by those skilled in the art to be algorithms implementing certain mathematical functions that are defined as the kernel. The function of a kernel is to take data as input and transform it into the required form. Different SVM algorithms use different types of kernel functions, for example linear, nonlinear, polynomial, radial basis function (RBF), and sigmoid. Each of these different types of kernels have an associated set of parameters that are used in constructing a model.

In the disclosed embodiment, a linear kernel has been employed, as the classification function is a simple yes/no decision—a data model for a particular room or subspace will indicate either that a particular object, as represented by a set of RSSI data samples provided by an associated tag, are predicted to be either "yes—in the room associated with the model" or "no—not in this room."

Those skilled in the art will also understand that certain SVM kernels also have another set of parameters called hyperparameters, for example the "soft margin constant" and other parameters of the chosen kernel function such as the width of a Gaussian ken or degrees of a polynomial kernel. Those skilled in the art of implementing SVM functions will understand how to select and optimize parameters and hyperparameters for a chosen SVM kernel, as well as choosing an appropriate kernel (or other classification algorithm) for a specific application of the present invention.

The Parallelize per parameter choice process starts at step 1620, where the data in the training database (or survey database, original or as updated/reinforced) is processed on a partitioned basis, for example, all the data associated with a particular beacon are found and processed, or all the data associated with a particular zone or room are processed.

At step 1622, any required hyperparameters for the selected parameter are chosen and applied. At step 1625, a SVM data model is generated, i.e. by application of the selected kernel, to assess the closeness of the "fit" of the data to an expected minimized "distance" of the particular data of a sample to the associated line, plane, hyperplane, or other reference geometry. Stated in other words, the fit of an SVM is a determination of the acceptable error margin of the soft margin parameter. It will be understood that an SVM with a linear kernel (or classifier) may be easier to determine a suitable fit, since the only parameter that affects performance is the soft margin constant. Of course, other kernels and degrees of fit may be employed, e.g. Gaussian, polynomial, and others.

After determining an acceptable fit of the data used for training, the SVM model is validated at step 1628. Validation of an SVM model may be effected by running the same training data, and/or additional data, through the model again, and assessing the error.

The result of each Parallelize per parameter choice process 1610 is provided to a Choose Best Fit step 1630, a part of the Parallelize per Zone process 1505. This step entails assessing the results of different kernels, parameters, and hyperparameters, and determining a particular model with kernel, parameter and hyperparameters, for use with the training data set, that represents a chosen "best fit" of the training data to provide acceptable results in location prediction. It will be understood that various different types of kernels may be employed in embodiments of the invention, and that different kernels may be used for the same training data, as a matter of selected performance and accuracy.

The result of the Parallelize per Zone process 1605 is a Data Model export file provided at step 1640, one or more depending upon the choice of SVM kernels, parameters, and hyperparameters used to construct the data model. The Data Model export file, as illustrated in the accompanying table, is written to the model storage database 750. The data items of the Data Model export file 1640 include but are not limited to the following: a user or customer identifier (CustomerLabel), a master space identifier (SiteLabel), a time stamp of the data of the survey used to construct the model (SessionStartTime), one or more zone identifiers (area, room, subspace), and model delimiters (<Model> . . . </Model>) encapsulating the data corresponding to the data model.

According to one aspect of this disclosure, the Data Model export file is stored in the model storage database 750 indexed and/or searchable by a parameter corresponding to identification of the "beacons heard", that is, by a parameter that represents the particular beacons whose signal values from the initial survey scan are present. Data models are preferably retrieved for use in an object location operation by using a set of beacons, based on their identifiers, from the tag data package from the tag associated with the object to be found, to search in the model storage database for models that have a matching set of beacons. For example, and referring back to FIG. 12D, note that the scan from the tag at prediction time included signals received from beacons B1, B2, B7, B8, and B9. These are the "beacons heard" by the tag. The data models Model R1 and Model R3 also have the same set of "beacons heard". Thus, these particular data models are retrieved from the model storage database 750 for use in the object location operation, as will be described. Those skilled in the art will understand how to construct an efficient retrieval algorithm for data model retrieval.

FIG. 17 illustrates a process 1700 used to implement an Object Location function or process. According to one aspect, a specific object 20 associated with a particular RF tag 25 located in a particular zone (area, room, subspace) is located in response to receipt at the disclosed object location system 10 of tag data package transmitted from an RF tag, and a room prediction data item (also known as a Zone Prediction) is returned by the process, which is then provided for use by the customer or user of the system 10 for its own purposes and applications. In accordance with one aspect, one or more ML data models are employed to conduct the room prediction, based on data accumulated during one or more surveys of the beacon signals that are receivable in the master space, as described above.

In one aspect, the Object Location process 1700 comprises several nested subroutines or subprocesses including a Parallelize for all inbound requests process 1710, which is executed for each object location operation however invoked, and a Parallelize per sample process 1720, which is executed for each collection of RF data samples in a tag data packaged received from the tag associated with the object to be located.

The Parallelize for all inbound requests process 1720 begins at step 1712, where the system 10 has received a tag data package from a tag 25 associated with an object 20 to be located. The step 1712 is identified as Submit BLE scan with Cust/Site ID, indicating that the object location operation is invoked by providing an object location request data package 1714 that includes particular customer identifier (CustID), an identifier of the master space involved (SiteID), and a collection of RF data (RSSI values) associated with the RF beacon signals received by the tag from the one or more RF beacons within the to-be-identified subspace, and, the beacon identifiers associated with the RF beacons from which the tag receiver received RF beacon signals. As shown in FIG. 17, the data items associated with an object location request data package command or request to identify an object location include but are not limited to: a customer identifier (CustID), a master space identifier (SiteID), and one or more sets of "scans" comprising a beacon identifier and the RSSI values detected from that beacon and its one or more channels by the tag. Here is an exemplary format for an object location request data package as seen in FIG. 17:

CustID: Acmelnc
SiteID: BeepBeep190

| MAC address | Channel ID | RSSI | | |
|---|---|---|---|---|
| dc18bdf10 | ch37 | −45 | −45 | −50 |
| | ch38 | −60 | | |
| 9381c8043 | ch36 | −45 | −45 | −50 |

Upon receipt of this object location request data package 1714, at step 1716 the model storage database 750 is accessed to obtain one or more prestored data models for the particular SiteID of the particular user of customer, as well as any required supplementary data (e.g. metadata further identifying locations, rooms, master spaces, street addresses, etc.) from the Customer Database 760. Upon fetching of any data models (a/k/a Zone Models), a Parallelize Per Sample process 1720 is invoked.

At step 1725, an array is filled with the RSSI data values/samples in the object location request data package (Fill X Array), and at step 1730, a Parallelize Per Zone process 1730 is executed to obtain a prediction of whether the tag and associated object are predicted to be in or out of a particular zone (room, subspace.

The result of the Parallelize Per Zone process 1730 is one or more predictions of a particular zone (room, subspace) in which the tag 25 that provided the RSSI values received from the beacon(s) in the subspace. Typically, a plurality of predictions of rooms will be generated, as multiple data models will be employed for a room prediction. At step 1735, these multiple room predictions are preferably sorted by "strength" i.e., which according to one aspect facilitates a calculation of a probability and/or use of a "weighted voting" scheme that the object is located in that particular room. Reference is made in this regard to FIG. 12, which is an exemplary table of RSSI values and room predictions. By sorting a table of this nature populated with RSSI values from the detected beacons in the columns by RSSI value, it will be seen that the predictions of Room A are more frequent than those of Room B.

A list or table of sorted room predictions such as shown in the example of FIG. 12 is then inspected at step 1740 to consolidate, i.e. identify, any contradictory samples. For example, as in the example table in FIG. 11, the prediction of Room B may be in error, as three of four data models predicted Room A; Room B is therefore contradictory according to a voting scheme, as employed in one aspect, and may be eliminated as a room prediction, or used in a probability calculation. At step 1745 a response (a zone or subspace prediction) is formatted, and at step 1750 a zone (or room, subspace) prediction of location is provided as an output. A typical format of a zone prediction data package returned is shown at 1755, and includes data items including but not limited to: customer or user identifier (CustID), a master space identifier (SiteID), and a result comprising a confidence level e.g. 0.983 representing a probably calculation, a zone or subspace or room identifier (Room A), and optionally, accompanying metadata such as a name of the zone or subspace obtained by reference to customer information e.g. "Storeroom SE Corner."

Use of Static Object for Calibration and Object Location Determination Resolution According to another aspect, a static or reference object is used for calibration of the disclosed object location system, as providing additional, static, stable reference data for use in a data model.

Referring back to FIG. 4, a stationary object 20b with associated tag 25b is shown positioned in Room D. The tag 25b need not be associated with an object, but may provide a suitable indicator to the system that it is stationary. According to this aspect, the tag 25b is queried on some predetermined basis (e.g. periodically, on a set schedule, randomly, etc.) to provide a tag data package that comprises readings from a predetermined set of beacons whose signals are received by the tag 25b. For example, in FIG. 4, the tag 25b is shown receiving signals from beacons B2, B4, and B5. Signals from these beacons B2, B4, and B5 were previously detected and used in generating one or more data models for Room D in a prior survey operation. Generally, it is expected that the signals from these beacons will remain consistent over time and that the RS SI values received by tags within Room D will only vary by a small, acceptable error, perhaps due to component drift, deterioration, temperature, or other factors. However, those skilled in the art will recognize that radio signals will change over time due to those factors. Furthermore, the radio signals received by the exemplary stationary tag 25*b*, as well as received by any tags and objects in a location operation, may be altered or affected by other changes in the environment. For example, the introduction of Faraday barriers or cages, removal or addition of structural features such as windows, doors, roof or ceiling materials, > flooring, obstacles, items on a shelf, etc. may significantly alter the RF environment and change the signals received by the stationary tag 25*b*.

If the change is sufficiently nominal, there is no need to take any action. However, there may be an error margin that suggests, or mandates, that adjustments be made in the data model(s) to compensate for changes. According to an aspect, the system 10 is operative to access the stationary tag 25*b* from time to time, and log the beacon signals received by the tag, and process the log for a deviation of the RSSI values that are indicative of a change in the environment. Steps for accessing the tag 25*b* and monitoring for changes in the RF environment may include, but are not limited to: (a) transmit a trigger signal to the tag 25*b* to cause a sampling operation, (b) the tag 25*b* collects a set of data values for the beacons whose signals it detects, (c) the tag 25*b* transmits a tag data package to the object location system, (d) the object location system receives the transmitted data from the tag and stores it in a local database in association with data from this particular stationary tag (as well as any other stationary tags), (e) the system processes the data from the stationary tag to compare the readings with a calculated standard, (f) in the event that an error or deviation of the stationary tag data exceeds a predetermined threshold, an "action condition" is indicated and provided to a system operator. It will be understood that data from prior operations that has accumulated over a certain predetermined time period may be used to determine the predetermined threshold, e.g. a mean of RSSI values of the various detected beacons over a predetermined time period, a sliding/moving set of values, etc.

According to one aspect, in the event of a error of a predetermined magnitude, but less than a second predetermined magnitude that amounts to an error condition that needs attention, may be used for a calibration operation. In such an operation, the system operator may conclude that the beacons or other components are experiencing a drift of an acceptable degree over time, but not sufficient to indicate failure or unusability. In this exemplary case, the deviation amount may be used as the basis for a calibration adjustment of data values that were used to make up the data model(s). Therefore, the training data (and/or associated model) may be adjusted by adding a calibration value or offset to each prestored survey data item to compensate for the acceptable error or drift. From the foregoing, those skilled in the art will be enabled to provide computer program code to effect such calibration or error condition alerts.

Accordingly, it will now be understood that a monitored static object in a subspace provides for calibration and/or some degree of error compensation. In the event that the RF environment, shielding by other objects or structures, or other RF-affecting issues occur, a user of the system can continue to improve its model in ML iterations by knowing that the static object is still at its location but with alerts that the RF environment may have changed.

From the foregoing, it will now be appreciated that there is disclosed a system for location of objects within an identified subspace of a plurality of subspaces defined within a predefined master space. The disclosed system comprises a plurality of radio frequency (RF) emitting beacons positioned in a predetermined arrangement such that the RF energy from the RF beacons illuminates at least a portion of the predefined master space and one or more of the subspaces, each of the RF beacons located in a position spaced apart from other RF beacons, each of the RF beacons transmitting an RF beacon signal at a predetermined frequency and having a beacon identifier.

The system further comprises one or more RF transmitting and receiving tags in proximate association with objects to be located in the master space, the RF tag including (i) an electronic tag identifier, (ii) a tag receiver operative to receive RF beacon signals from one or more of the RF beacons as the tag assumes a position within the predefined master space, (iii) a tag data package assembler, and (iv) a tag transmitter operative to transmit a tag data package assembled by the tag data package assembler.

The system further comprises a models database for storing machine learning (ML) models.

The system further comprises an object location system including a radio gateway for receiving tag data packages transmitted by the RF transmitting and receiving tag, and a computer-implemented object location engine coupled to the radio gateway. In accordance with disclosed aspects of the system, the object location system is operative for:

for a predefined master space in which an object is to be located, in a master space survey operation, assigning a plurality of subspace identifiers to a plurality of subspaces having specific spatial boundaries within the master space and storing the subspace identifiers in a master space database for later association with RF signal data samples taken in a master survey operation;

conducting a master space survey operation by collecting data comprising RF signal data samples within the master space, generating one or more subspace data models from the RF signal data samples for use in connection with an object location operation, and storing the one or more subspace data models in the models database;

for an object location operation to locate an object associated with a particular RF tag associated within a to-be-identified subspace within the master space, receiving RF beacon signals at the tag receiver from one or more of the RF beacons within the to-be-identified subspace within the master space, to thereby obtain a tag-specific RF beacon signal reading data comprising data derived from one or more RF beacon signals and their associated beacon identifiers within the to-be-identified subspace;

at the tag data package assembler associated with the particular RF tag, using the RF beacon signal reading data, generating a tag data package comprising (i) a tag identifier of the particular RF tag, (ii) data associated with the RF beacon signals received from the one or more RF beacons within the to-be-identified subspace, and (iii) the beacon identifiers associated with the RF beacons from which the tag receiver received RF beacon signals;

at the particular RF tag, transmitting the tag data package from the tag data package assembler via the tag transmitter of the RF tag;

receiving a transmitted tag data package from the tag transmitter of the particular RF tag at the receiver associated with the radio gateway so as to receive RF signals containing tag data packages transmitted from one or more RF tags within the to-be-identified subspace within the predefined master space;

processing a tag data package received by the radio gateway receiver to extract the RF beacon signals received by the tag receiver in the particular RF tag associated with the object to be located in the to-be-identified subspace, the beacon identifiers, and the tag identifiers associated therewith;

retrieving one or more stored subspace data models from the models database based on one or more beacon identifiers contained in the tag data package received from the tag associated with the object to be located;

executing the retrieved one or more stored subspace data models using as input parameters the RF beacon signals extracted from the tag data package received from the tag associated with the object to be located, to identify one or more prediction candidates of subspaces in which the object may be located, each prediction candidate comprising a subspace identifier produced by execution of each of the subspace data models;

processing the one or more prediction candidates with a selection operation to determine a particular one of the subspace identifiers as the selected subspace identifier in which the object is predicted by the system to be located and thereby generate a determined subspace identifier for the object; and based on the determined subspace identifier, providing a data output from the object location system as a data package identifying the particular tag and the determined subspace identifier to an external system, as indicating the location of the object associated with the tag.

It also be appreciated that the identified subspace may be a physical subspace defined by physical boundaries including but not limited to as walls, ceiling, floors, and the like. The identified subspace may also be a virtual subspace defined by virtual boundaries within one or more physical rooms. The master space may be a building and the subspace may be a room in the building.

According to one aspect, the above-mentioned master space survey is conducted by the steps of:

receiving data from a sampling operation with a sampling RF receiver in a survey device, by collecting RF data in the plurality of subspaces within the predefined master space by collecting RF signal samples from one or more RF beacons at a plurality of sampling locations within each of the one or more of the subspaces in the predefined master space;

for each of the subspaces, storing sampling data corresponding to said RF signal samples and beacon identifiers associated with the RF signal samples from the sampling receiver in a sampling database correlated with a sampling location corresponding to a particular one of the subspaces as indicated by a corresponding subspace identifier;

generating one or more subspace data models of the subspaces by applying a machine learning (ML) algorithm to the sampling data in the sampling database; and storing the one or more subspace data models in an ML model database for later access in connection with an object location operation.

In accordance with an aspect, the master space survey operation collects RF signal data from one or more identifiable RF signal sources (IRFSS) in addition to signal data from RF beacons, and wherein the one or more subspace data models are generated using data from said one or more IRFSS. The one or more IRFSS may include but are not limited to: Wi-Fi (IEEE 802.11) access points, Zigbee access points, Bluetooth transmitters, cellular network transmitters (2G-5G and beyond), AM/FM/shortwave/television transmitters.

According to one aspect, the RF signal data samples are in the form of received signal strength indicator (RSSI) data.

According to another aspect, the subspace data models are generated using a machine learning (ML) classification algorithm. The preferred ML classification algorithm is a support vector machine (SVM).

According to another aspect, a subspace data model comprises a collection of RF signal samples associated with each subspace identifier, associated beacon identifiers, and RSSI values taken in the master space survey operation, each of said data models predicting a particular subspace identifier. The subspace data models are preferably derived from multiple sampling operations conducted at different locations within each subspace of the master space.

According to a further aspect, each subspace is associated with a plurality of subspace data models, wherein the system is operative to generate a plurality of prediction candidates of subspaces in which the object may be located from a plurality of data models for each object location operation, and wherein the selection operation comprises determining an identified subspace for the object based on a voting algorithm executed on the plurality of prediction candidates. Preferably, the selection operation comprises a voting process based on the greatest number of instances of determination of a particular subspace identifier by one of a plurality of different stored subspace data models.

According to another aspect, the system further conducts steps whereby the data values derived from an object location operation are added to a database together with the data from the master space survey operation and used to dynamically update the subspace data models.

According to another aspect, the RF receiving and transmitting tag includes a signaling component, wherein a user is provided with a communication device for communicating to the system indicating proximity to a subspace identified as containing the tag, and wherein the system executes a "last ten feet" proximity operation to notify a user of proximity to the RF tag upon approach by the user having possession of the communication device, by actuating the signaling component. As disclosed, the signaling device may include one or more of a light, an audible sound generating device, a haptic signaling component.

According to one preferred aspect, the RF receiving and transmitting tag includes a motion sensor that is operative to trigger transmission of a tag data package in response to detection of movement of the tag.

According to another aspect, the system is further operative to automatically detect changes in the RF environment of the master space resulting from physical changes to the environment by detecting a change in RF signals from one or more beacons or other IFRSS during an object location operation, and update one or more subspace data models to compensate for the changed environment. In this regard, the system may be configured to automatically detect changes in the RF environment of the master space resulting from failure or degradation of one or more beacons by detecting a change in or absence of RF signals from one or more beacons during an object location operation, and update one or more subspace data models to compensate for the changed environment.

It will also now be appreciated that the present disclosure described a method for location of objects within an identified subspace defined within a predefined master space. The disclosed method comprises steps including:

for a predefined master space in which an object is to be located, in a master space survey operation, assigning a plurality of subspace identifiers to a plurality of subspaces having specific spatial boundaries within the master space and storing the subspace identifiers in a master space database for later association with RF signal data samples taken in a sampling operation;

placing a plurality of radio frequency (RF) emitting beacons in a predetermined arrangement such that the RF energy from the RF beacons illuminates at least a portion of the predefined master space and one or more of the subspaces, each of the RF beacons located in a position spaced apart from other RF beacons, each of the RF beacons transmitting an RF beacon signal at a predetermined frequency and having a beacon identifier;

conducting a master space survey operation by collecting data comprising RF signal data samples within the master space, generating one or more subspace data models from the RF signal data samples for use in connection with an object location operation, and storing the one or more subspace data models in the models database;

for an object to be located within a particular subspace within the master space via an object location operation via an object location system, associating a RF transmitting and receiving tag with the object, the RF tag including (i) an electronic tag identifier, (ii) a tag receiver operative to receive RF beacon signals from one or more of the RF beacons as the tag assumes a position within the predefined master space, (iii) a tag data package assembler, and (iv) a tag transmitter operative to transmit a tag data package assembled by the tag data package assembler;

for an object location operation, at particular RF tag associated with an object to be located within a to-be-identified subspace via the object location operation within the master space, receiving RF beacon signals at the tag receiver from one or more of the RF beacons as the object assumes a position within the to-be-identified subspace within the master space, to thereby obtain a tag-specific RF beacon signal reading data comprising data derived from one or more RF beacon signals and their associated beacon identifiers within the to-be-identified subspace;

at the tag data package assembler associated with the particular RF tag, using the RF beacon signal reading data, generating a tag data package comprising (i) a tag identifier of the particular RF tag, (ii) data associated with the RF beacon signals received from the one or more RF beacons within the to-be-identified subspace, and (iii) the beacon identifiers associated with the RF beacons from which the tag receiver received RF beacon signals;

at the particular RF tag, transmitting the tag data package from the tag data package assembler via the tag transmitter of the RF tag;

at an object location system, receiving a transmitted tag data package from the tag transmitter of the particular RF tag at receiver associated with a radio gateway so as to receive RF signals containing tag data packages transmitted from one or more RF tags within the to-be-identified subspace within the predefined master space;

at the object location system, processing a tag data package received by the radio gateway receiver to extract the RF beacon signals received by the tag receiver in the particular RF tag associated with the object to be located in the to-be-identified subspace, the beacon identifiers, and the tag identifiers associated therewith;

with the object location system, retrieving one or more stored subspace data models from the ML database based on one or more beacon identifiers contained in the tag data package received from the tag associated with the object to be located;

(k) with the object location system, executing the retrieved one or more stored subspace data models using as input parameters the RF beacon signals extracted from the tag data package received from the tag associated with the object to be located, to identify one or more prediction candidates of subspaces in which the object may be located, each prediction candidate comprising a subspace identifier produced by execution of each of the subspace data models;

(l) processing the one or more prediction candidate with a selection operation to determine a particular one of the subspace identifiers as the selected subspace identifier in which the object is predicted by the system to be located and thereby generate a determined subspace identifier for the object;

(m) based on the determined subspace identifier, providing a data output from the object location system as a data package identifying the particular tag and the determined subspace identifier to an external system, as indicating the location of the object associated with the tag.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless)

to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

The invention claimed is:

1. A object location system comprising:

a processor; and a memory storing instructions that, when executed by the processor cause the processor to:

receive a transmitted tag package from a Radio Frequency (RF) tag associated with an object, the transmitted tag package comprising a representation of a plurality of RF signals received by the RF tag from a respective plurality of RF signal sources;

access a plurality of machine-learning data models, each of the plurality of machine-learning data models associated with a respective one of a plurality of subspaces, and each one of the plurality of machine-learning data models trained by:

generating a session identifier for a measurement session;

retrieving a customer site number associated with a master space;

identifying a zone label and coordinates for one of the plurality of subspaces within the master space based on customer site information;

associating the zone label with a location number;

storing the session identifier, zone label, coordinates, and location number in a location list;

generating a scan identifier for a radio frequency (RF) signal sampling operation;

collecting RF signal strength indicator (RSSI) values from a plurality of RF beacons within the one of the plurality of subspaces;

associating the collected RSSI values with the location number;

generating a measurement log comprising the session identifier, zone label, scan identifier, and collected RSSI values; and processing the measurement log to create the one of the plurality of machine-learning data models, the one of the plurality of machine-learning data models associated with the one of the plurality of subspaces;

provide the representation of RF signals to each of the plurality of machine-learning data models;

receive, from each of the plurality of machine-learning data models, a correlation between the representation of RF signals and that machine-learning data model;

determine a highest correlation of the received correlations;

select, from the plurality of machine-learning models, a candidate machine-learning data model from which the highest correlation was received; and predict that the object is located in a subspace of the plurality of subspaces associated with the candidate machine-learning data model.

2. The object location system of claim 1, wherein:

comparing the representation of RF signals to each of the plurality of machine-learning data models further includes comparing signal strengths of the RF signals to signal strengths of the RF signal samples of each of the plurality of machine-learning data models.

3. The object location system of claim 1, wherein:

comparing the representation of RF signals to each of the plurality of machine-learning data models further includes comparing a received signal strength indicator (RSSI) of the RF signals to an RSSI of the RF sample signals associated with each of the plurality of machine-learning data models.

4. The object location system of claim 1, wherein:

the representation of RF signals includes an RF signal on a first channel and an RF signal on a second channel, the RF signal samples associated with each of the plurality of machine-learning data models include a first RF signal sample on the first channel and a second RF signal sample on the second channel, and comparing the representation of RF signals to each of the plurality of machine-learning data models further includes comparing the representation of RF signal on the first channel to each of the first RF signal samples and comparing the representation of the RF signal on the second channel to each of the second RF signal samples.

5. The object location system of claim 1, further comprising classifying the representation of RF signal to match one data model of the plurality of machine-learning data models.

6. The object location system of claim 1, further comprising classifying the representations of the RF signal using a support vector machine (SVM).

7. The object location system of claim 1, wherein the representation of the plurality of RF signals includes a received signal strength indicator (RSSI) value.

8. The object location system of claim 1, wherein the representation of the plurality of RF signals includes a representation of a first RF signal and a representation of a second RF signal, the first RF signal and second RF signal being on different RF channels.

9. The object location system of claim 1, further comprising:

generating a probability that the RF signal is in one of a plurality of a candidate subspaces corresponding to each of the plurality of machine-learning data models, and comparing the probabilities generated; and wherein selecting the candidate machine-learning data model further includes selecting the candidate machine-learning data model based on the probabilities generated for the plurality of candidate subspaces.

10. The object location system of claim 9, wherein selecting the subspace further includes selecting the subspace associated with the candidate machine-learning data model having the highest probability of the plurality of machine-learning data models.

11. The object location system of claim 1, wherein selecting the candidate machine-learning data model is based on a weighted vote of the correlations received.

12. A method of locating an object comprising:

receiving a transmitted tag package from a Radio Frequency (RF) tag associated with an object, the transmitted tag package comprising a representation of a plurality of RF signals received by the RF tag from a respective plurality of RF signal sources;

accessing a plurality of machine-learning data models, each of the plurality of machine-learning data models associated with a respective one of a plurality of subspaces, and each of the plurality of machine-learning data models trained by:

generating a session identifier for a measurement session;

retrieving a customer site number associated with a master space;

identifying a zone label and coordinates for one of the plurality of subspaces within the master space based on customer site information;

associating the zone label with a location number;

storing the session identifier, zone label, coordinates, and location number in a location list;

generating a scan identifier for a radio frequency (RF) signal sampling operation;

collecting RF signal strength indicator (RSSI) values from a plurality of RF beacons within the one of the plurality of subspaces;

associating the collected RSSI values with the location number;

generating a measurement log comprising the session identifier, zone label, scan identifier, and collected RSSI values; and processing the measurement log to create the one of the plurality of machine-learning data models, the one of the plurality of machine-learning data models associated with the one of the plurality of subspaces;

providing the representation of RF signals to each of the plurality of machine-learning data models;

receiving, from each of the plurality of machine-learning data models, a correlation between the representation of RF signals and that machine-learning data model;

determining a highest correlation of the received correlations;

selecting, from the plurality of machine-learning models, a candidate machine-learning data model from which the highest correlation was received; and predicting that the object is located in a subspace of the plurality of subspaces associated with the candidate machine-learning data model.

13. The method of claim 12, further comprising:
comparing signal strengths of the RF signals to signal strengths of the RF signal samples each of the plurality of machine-learning data models.

14. The method of claim 12, further comprising:
comparing a received signal strength indicator (RSSI) of the RF signals to an RSSI of the RF sample signals associated with each of the plurality of machine-learning data models.

15. The method of claim 12, wherein:
the representation of RF signals includes an RF signal on a first channel and an RF signal on a second channel, the RF signal samples associated with each of the plurality of machine-learning data models include a first RF signal sample on the first channel and a second RF signal sample on the second channel, and the method further comprises:

comparing the representation of RF signal on the first channel to each of the first RF signal samples and comparing the representation of the RF signal on the second channel to each of the second RF signal samples.

16. The method of claim 12, further comprising classifying the representation of the RF signal to match one machine-learning data model of the plurality of machine-learning data models.

17. The method of claim 12, further comprising classifying the representations of the RF signal using a support vector machine (SVM).

18. The method of claim 12, wherein the representation of the plurality of RF signals includes a received signal strength indicator (RSSI) value.

19. The method of claim 12, wherein the representation of the plurality of RF signals includes a representation of a first RF signal and a representation of a second RF signal, the first RF signal and second RF signal being on different RF channels.

20. The method of claim 12, further comprising:
generating a probability that the RF signal is in one of a plurality of a candidate subspaces corresponding to each of the plurality of machine-learning data models, and comparing the probabilities generated; and wherein selecting the candidate machine-learning data model further includes selecting the candidate machine-learning data model based on the probabilities generated for the plurality of candidate subspaces.

21. The method of claim 1, further comprising:
dynamically updating the plurality of data machine-learning data models in response to physical changes in the environment.

* * * * *